United States Patent
Pesach et al.

(10) Patent No.: US 11,612,461 B2
(45) Date of Patent: Mar. 28, 2023

(54) TRACKED DENTAL MEASUREMENT DEVICE

(71) Applicant: Dentlytec G.P.L. LTD., Tel-Aviv (IL)

(72) Inventors: Benny Pesach, Rosh Haayin (IL); Amitai Reuvenny, Kfar-Saba (IL); Blanc Zach Lehr, Tel-Aviv (IL); Ygael Grad, Tel-Aviv (IL)

(73) Assignee: DENTLYTEC G.P.L. LTD., Tel-Aviv (IL)

( * ) Notice: Subject to any disclaimer, the term of this patent is extended or adjusted under 35 U.S.C. 154(b) by 310 days.

(21) Appl. No.: 16/628,655

(22) PCT Filed: Jul. 4, 2018

(86) PCT No.: PCT/IL2018/050730
§ 371 (c)(1),
(2) Date: Jan. 3, 2020

(87) PCT Pub. No.: WO2019/008585
PCT Pub. Date: Jan. 10, 2019

(65) Prior Publication Data
US 2020/0121429 A1     Apr. 23, 2020

Related U.S. Application Data

(60) Provisional application No. 62/528,475, filed on Jul. 4, 2017.

(51) Int. Cl.
*A61C 9/00* (2006.01)
*A61C 19/04* (2006.01)
*G06T 7/00* (2017.01)

(52) U.S. Cl.
CPC .......... *A61C 9/0053* (2013.01); *A61C 9/0066* (2013.01); *A61C 19/04* (2013.01);
(Continued)

(58) Field of Classification Search
CPC ..... A61C 9/0053; A61C 9/0066; A61C 19/04; A61C 19/043; G06T 7/0012; G06T 2207/30036
See application file for complete search history.

(56) References Cited

U.S. PATENT DOCUMENTS 5,278,756 A     1/1994 Lemchen et al.
9,675,428 B2 *  6/2017 Wu ..................... A61B 5/4547
(Continued)

FOREIGN PATENT DOCUMENTS

EP      0286067 A2      10/1988
WO      2004069080 A1    8/2004
(Continued)

OTHER PUBLICATIONS

Yamany et al., "A 3-D reconstruction system for the human jaw using a sequence of optical images," in IEEE Transactions on Medical Imaging, vol. 19, No. 5, pp. 538-547, May 2000 (Year: 2000).*

(Continued)

*Primary Examiner* — Nay A Maung
*Assistant Examiner* — Jose M Torres
(74) *Attorney, Agent, or Firm* — Cooley LLP

(57) ABSTRACT

A method of collecting dental measurements comprising: receiving optical measurement data of at least a portion of a subject's mouth; contacting a portion of a measuring device to portions of the subject's mouth to collect position measurement data, where the measuring device includes a tracker; and combining the optical measurement data and the position measurement data.

22 Claims, 16 Drawing Sheets

(52) U.S. Cl.
CPC .......... *A61C 19/043* (2013.01); *G06T 7/0012* (2013.01); *G06T 2207/30036* (2013.01)

(56) References Cited

U.S. PATENT DOCUMENTS

| | | | |
|---|---|---|---|
| 2009/0061381 A1* | 3/2009 | Durbin | A61C 5/77 433/24 |
| 2010/0023996 A1 | 1/2010 | Sabin et al. | |
| 2010/0239996 A1 | 9/2010 | Ertl | |
| 2011/0111360 A1 | 5/2011 | Volkl et al. | |
| 2013/0273492 A1* | 10/2013 | Suttin, Sr. | A61B 1/24 433/29 |
| 2015/0348320 A1 | 12/2015 | Pesach et al. | |
| 2016/0338803 A1 | 11/2016 | Pesach | |
| 2017/0007377 A1 | 1/2017 | Pesach et al. | |
| 2017/0056136 A1* | 3/2017 | Adamson | A61B 1/045 |
| 2018/0028063 A1* | 2/2018 | Elbaz | G06T 17/00 |

FOREIGN PATENT DOCUMENTS

| | | |
|---|---|---|
| WO | WO 2004/069080 A1 | 8/2004 |
| WO | 2016178212 A1 | 11/2016 |
| WO | WO 2016/178212 A1 | 11/2016 |
| WO | WO 2019/008585 A1 | 1/2019 |

OTHER PUBLICATIONS

International Search Report and Written Opinion prepared for International Application No. PCT/IL2018/050730, dated Oct. 29, 2018.
International Preliminary Report on Patentability dated Jan. 16, 2020 From the International Bureau of WIPO Re. Application No. PCT/IL2018/050730. (9 Pages).
International Search Report and the Written Opinion dated Oct. 29, 2018 From the International Searching Authority Re. Application No. PCT/IL2018/050730. (14 Pages).
Supplementary European Search Report and the European Search Opinion dated Feb. 19, 2021 From the European Patent Office Re. Application No. 18828934.2. (9 Pages).
Communication Pursuant to Article 94(3) EPC dated Jan. 26, 2022 From the European Patent Office Re. Application No. 18828934.2. (5 Pages).

* cited by examiner

TRACKED DENTAL MEASUREMENT DEVICE

RELATED APPLICATIONS

This application is a U.S. national phase application of PCT application no. PCT/IL2018/050730, having an International filing date of 4 Jul. 2018, which claims benefit of and priority to U.S. provisional application No. 62/528,475, filed on 4 Jul. 2017. This application is also related to U.S. provisional patent application No. 62/409,670, PCT patent application nos. PCT/IL2013/051059, PCT/IL2016/050023, PCT/IL2016/050058 and PCT/IL2016/050449. The entire contents of each of the foregoing applications is incorporated herein by reference.

FIELD AND BACKGROUND OF THE INVENTION

The present invention, in some embodiments thereof, relates to devices and methods for dental measurement and, more particularly, but not exclusively, to devices and methods for dental measurements including subgingival dental measurements.

SUMMARY OF THE INVENTION

Following are examples of some embodiments of the invention. Features of one example may be combined with features of one or more other examples, unless expressly prohibited and form additional examples of some embodiments of the invention.

Example 1. A method of collecting dental measurements comprising:
receiving optical measurement data of at least a portion of a subject's mouth;
contacting a portion of a measuring device to portions of said subject's mouth to collect position measurement data, where said measuring device includes a tracker;
combining said optical measurement data and said position measurement data.

Example 2. The method according to example 1, wherein said contacting comprises measuring a position of said measuring device with respect to a second tracker, where said second tracker is external to said tracked measuring device.

Example 3. The method according to any one of examples 1-2, wherein said combining comprises said optical measurement data and said position measurement data.

Example 4. The method according to any one of examples 1-3, wherein said contacting comprises contacting said portion to at least one point on said subject's mouth, where said optical measurement data includes said at least one point on said subject's mouth.

Example 5. The method according to example 4, wherein said contacting comprises contacting said portion to at least six points on said subject's mouth, where said optical measurement data includes said at least six points on said subject's mouth.

Example 6. The method according to any one of examples 1-5, wherein said optical measurement data is a 3D model of a surface of said portion of said subject's mouth.

Example 7. The method according to example 6, wherein said combining comprises correcting said 3D model using said position measurement data to generate a second 3D model.

Example 8. The method according to any one of examples 6-7, wherein said method comprises extending said 3D model using said position measurement data.

Example 9. The method according to example 8, wherein said optical measurement data and said position measurement data overlap, wherein said extending comprises using said data over to extend said 3D model.

Example 10. The method according to any one of examples 1-9, wherein said contacting a portion of a tracked measuring device comprises contacting an elongate stylus to portions of said subject's mouth.

Example 11. The method according to any one of examples 1-9, wherein said contacting comprises contacting an elongate stylus to subgingival portions of at least one tooth.

Example 12. The method according to example 10, wherein said contacting comprises contacting a tip of said stylus to said portions of said subject's mouth.

Example 13. The method according to 12, wherein said optical measurement data is received from a first IOS;
wherein said tracked measuring device is a second IOS to which said elongate stylus is attached.

Example 14. The method according to example 12, comprising calibrating a position of said tip with respect to said tracker.

Example 15. The method according to any one of examples 2-14, comprising affixing said second tracker to a portion of the subject's mouth.

Example 16. The method according to example 15, comprising affixing said second tracker to a subject's tooth or teeth.

Example 17. The method according to any one of examples 15-16, wherein said affixing comprises gluing.

Example 18. The method according to any one of examples 16-17, wherein said affixing comprises tightening an adaptor including said second tracker onto said subject's tooth or teeth.

Example 19. The method according to any one of examples 15-17, wherein said affixing comprises affixing a portion of a dental implant including said second tracker to said portion of said subject's mouth.

Example 20. The method according to any one of examples 15-16, wherein said second tracker is mounted on or at least partially recessed inside an adaptor, wherein said adaptor is sized and shaped to fit onto a portion said subject's mouth.

Example 21. The method according to example 20, wherein said method comprises, prior to affixing said tracker, constructing said adaptor using said optical measurement data.

Example 22. The method according to any one of examples 15-21, wherein at least one of said tracker and said second tracker includes an electromagnet;
wherein at least one of said tracker and said second tracker includes an electromagnetic position sensor configured to emit a signal based on a position of said electromagnet;
wherein said position measurement data comprises said signal.

Example 23. The method according to any one of examples 1-22, wherein said receiving comprises collecting optical measurement data using an intraoral scanner (IOS).

Example 24. The method according to any one of example 1-22, wherein said receiving comprises receiving optical measurement data collected by a first optical measurement device and a second optical measurement device.

Example 25. The method according to example 24, wherein said a first optical measurement device is a first IOS and a second optical measurement device measurement is a second IOS.

Example 26. The method according to any one of examples 24-25, comprising combining a first model generated using a first data set received from said first IOS with a second model generated using a second data set received from said second IOS.

Example 27. The method according to example 23, wherein said IOS comprises an IOS tracking element, wherein said receiving comprises collecting position measurement data from said IOS tracking element.

Example 28. The method according to any one of examples 1-27, wherein said receiving comprises receiving CT scan data.

Example 29. The method according to any one of examples 1-28, wherein said measuring device includes one or more optical sensor, wherein said receiving comprises collecting optical measurement data using said measuring device.

Example 30. The method according to any one of examples 1-29, wherein said optical measurement data includes measurement data of supragingival tooth portions;

wherein said position measurement data includes measurement data of subgingival tooth portions.

Example 31. The method according to example 30, wherein said position measurement data includes measurement of supragingival tooth portions.

Example 32. The method according to any one of examples 1-31, wherein said contacting comprises scanning said portion of said tracked measuring device along a plurality of tooth portions.

Example 33. The method according to example 32, wherein said scanning comprises scanning said portion of said tracked measuring device around a tooth.

Example 34. The method according to any one of examples 32-33, wherein said scanning comprising vibrating said portion of said tracked measuring device.

Example 35. The method according to any one of examples 6-8, wherein said model is a model of a surface of at least a portion a tooth.

Example 36. The method according to example 35, wherein said tooth is a tooth prepared for attachment thereto of a dental prosthetic.

Example 37. The method according to example 36, comprising constructing a dental prosthetic, including at least one portion sized and shaped based on said model of said tooth.

Example 38. The method according to any one of examples 1-37, comprising estimating a required amount of position measurement data for a portion of said subject's mouth.

Example 39. The method according to example 38, wherein a required amount of position data is based on a calculated curvature of said portion of said subject's mouth.

Example 40. The method according to example 1, wherein said measurement device is a standard dental probe onto which said tracker is mounted.

Example 41. The method according to any one of examples 1-40, wherein tracked measurement device includes a dental tool.

Example 42. The method according to 41, wherein said dental tool is an ultrasonic scaler.

Example 43. The method according to 42, wherein said dental tool is a dental drill.

Example 44. The method according to 43, comprising preparing a tooth using said dental drill.

Example 45. The method according to 44, wherein said receiving comprises receiving a first set of optical measurement data before said preparing and receiving a second set of optical measurement data after said preparing; and said method comprising combining a first model generated using said first set of optical measurement data with a second model generated using said second set of optical measurement data.

Example 46. A system for collecting dental measurements comprising:

a tracked measurement device including:

an elongate element sized and shaped to be inserted between a tooth and surrounding gingiva;

a tracker mounted on or at least partially recessed within the tracked measurement device;

a second tracker; and an intraoral scanner.

Example 47. The system according to example 46, wherein at least one of said tracker and said second tracker includes an electromagnet;

wherein at least one of said tracker and said second tracker includes an electromagnetic position sensor configured to sense a position of said electromagnet.

Example 48. The system according to any one of examples 46-47, wherein said second tracker is configured to be attached to a portion of said subject's mouth.

Example 49. The system according to any one of examples 46-48, wherein said second tracker is external to said device and not connected to said subject's mouth.

Example 50. The system according to any one of examples 46-49, comprising a third tracker configured to be attached to a portion of a human subject's mouth.

Example 51. The system according to example 50, wherein a portion of said tracked measurement device is sized and/or shaped to fit onto a portion of said intraoral scanner.

Example 52. The system according to any one of examples 46-51, wherein said tracked measurement device includes a gyroscope.

Example 53. The system according to any one of examples 46-52, wherein said tracked measurement device includes an accelerometer.

Example 54. The system according to any one of examples 50-37, wherein said intraoral scanner includes one or more tracker.

Example 55. An add-on apparatus for collecting dental measurements comprising:

a body;

an elongate element extending from said body and sized and shaped to be inserted between a tooth and surrounding gingiva;

a tracker mounted on recessed inside said body or said elongate element;

a connector configured to connect said body to an intraoral scanner.

Example 56. The add-on apparatus of example 55, wherein said add-on apparatus is sized and shaped to fit inside a human mouth with a distal portion of an IOS.

Example 57. A tracking system comprising:

a first tracker mounted on or at least partially recessed inside a device including:

a body;

an elongate element extending from said body and sized and shaped to be inserted between a tooth and surrounding gingiva; and a second tracker configured to be attached to a portion of a mouth;

wherein said system generates a signal based on a position of said at first tracker with respect to said second tracker.

Example 58. The tracking system of example 57, wherein said first tracker includes an electromagnet and said second tracker includes an electromagnetic sensor;

wherein said signal includes a signal from said electromagnetic sensor.

Example 59. The tracking system of example 58, wherein said second tracker includes an electromagnet and said first tracker includes an electromagnetic sensor;

wherein said signal includes a signal from said electromagnetic sensor.

Example 60. A method of collecting dental measurements comprising:

receiving 3D measurement data of at least a portion of a subject's mouth;

contacting a tip of a measuring device to portions of said subject's mouth to collect position measurement data, where said measuring device includes a tracker;

locating a location of said tip using measured tracking element location;

aligning a coordinate system of said tracker with said 3D measurement data;

combining said 3D measurement data and said position measurement data.

Example 61. The method according to example 60, wherein said contacting comprises contacting said tip to subgingival portions of said subject's mouth.

Example 62. A method of collecting dental measurements comprising:

collecting optical measurement data of at least a portion of a subject's mouth using a tracked intraoral scanner, where said intraoral scanner includes a tracker producing position measurement data;

combining said optical measurement data and said position measurement data.

Example 63. The method of example 62, wherein said combining comprises correcting said optical measurement data using said position measurement data.

Example 64. A method of collecting dental measurements comprising:

providing an IOS including a tracker;

receiving optical measurement data of more than one tooth of a subject from said IOS;

receiving position measurement data from one or both of said tracker and a second tracker affixed to a portion of a subject's mouth.

Example 65. The method according to example 64, comprising correcting accumulated error in said optical measurement data using said position measurement.

Example 66. The method according to any one of example 64-65, comprising saving said optical measurement data with said position measurement data, where one or more optical measurement data point is associated with a position measurement data point.

Example 67. The method according to example 66, wherein said optical measurement data associated with said position measurement data forms a first data set; and comprising:

repeating said receiving said optical measurement data and said position measurement data and said saving, to provide a second data set; and aligning said first and said second data set.

Example 68. The method according to example 67, wherein said first data set and said second data set are associated with different portions of a patient's mouth, where the portions do not overlap.

Example 69. The method according to any one of examples 66-67, wherein said repeating is performed after a time interval in which measurements are not taken.

Example 70. The method according to any one of examples 67-69, comprising generating a model from said first and said second data sets; and displaying said model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as collecting dental measurements, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
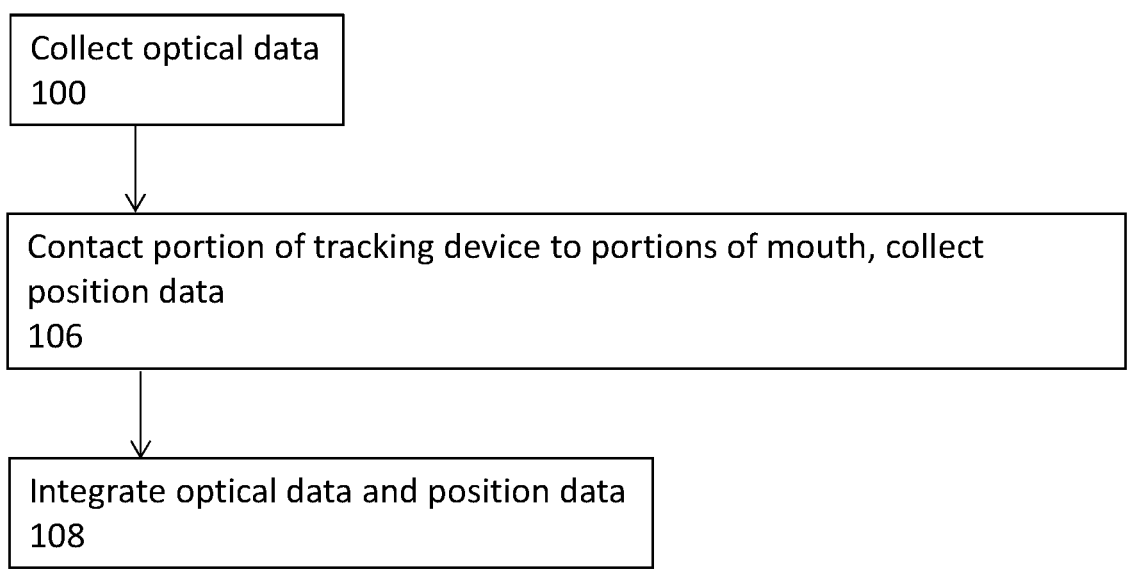
FIG. 1A is a flow chart of an exemplary method of dental measurement, according to some embodiments of the invention.

The present invention, in some embodiments thereof, relates to devices and methods for dental measurement and, more particularly, but not exclusively, to devices and methods for dental measurements including subgingival dental measurements.

Overview

A broad aspect of some embodiments of the invention relates to collecting optical measurement data and position measurement data of a portion of a patient's mouth and then integrating the data sets to provide a model of a portion of a patient's mouth.

In some embodiments, position measurement data provides measurement of non-visible mouth regions (e.g. subgingival tooth portions), for example, the position measurement data potentially increasing an extent of an optical measurement model. In some embodiments, position measurement data includes measurements of subgingival mouth portion/s (e.g. subgingival tooth measurements) and/or measurements of supragingival mouth portion/s whereas, in some embodiments, optical data only includes measurements of supragingival mouth portion/s.

A broad aspect of some embodiments of the invention relates to using position measurement data to improve the accuracy of and/or correct optical measurement data.

An aspect of some embodiments of the invention relates to correcting accumulated error (e.g. accumulated over large size scans) in optical measurements using position data. For example, in some embodiments, an optical data set is aligned with a position data set and the optical data is then corrected and/or deformed using the position data set. Potentially, correcting optical measurement data of mouth object/s improves fit of prosthetics constructed using the measurements. In some embodiments, position data measurements correct errors in optical measurements (e.g. collected using an intraoral scanner) accumulated over larger scan areas e.g. half arc, e.g. full arc, e.g. for a scan area with a largest dimension (e.g. length, e.g. a length of the arc of a full and/or half arc) of 0.5-25 cm, or 1-25 cm or 1-20 cm or 3-20 cm or lower or higher or intermediate lengths or ranges.

An aspect of some embodiments of the invention relates to combining optical measurements and position measurements to improve accuracy and/or resolution of measurement, for example, obtained with either optical or position measurement alone. In some embodiments, optical measurement (e.g. using an IOS) have good local accuracy, but loose accuracy (e.g. accumulate errors, e.g. associated with stitching together multiple scans) for larger scale scans (e.g. of more than 0.5 cm, or more than 1 cm or more than 2 cm, or more than 3 cm, or more than 5 cm or for scans of 2-25 cm or 5-25 cm, or lower or higher or intermediate scale scans, or for more than one tooth or more than 2 teeth or 2-18 teeth, or lower or higher or intermediate ranges or numbers of teeth). In some embodiments, position measurements are used to correct optical measurement data. In some embodiments, optical measurements are more accurate for small scale measurement and/or it is easier and/or faster to collect enough measurement data (e.g. to construct a prosthetic) using optical measurement data than using position measurements. Optionally, in some embodiments, position measurements are only used to correct errors (e.g. accumulated errors) in optical measurement. For example, in some embodiments, position measurement data is used to correct and/or deform optical measurement data, and, in some embodiments, does not replace portion/s of optical measurement data.

In some embodiments, measurement is collected for preparation of a dental prosthetic, for example, for one or more of a crown, a bridge, an implant, a guided surgical template, an orthodontic appliance. In some embodiments, measurement is collected for the purpose of medical records e.g. tracking patient condition, and/or diagnosis.

In some embodiments, optical measurement data is collected using an intraoral scanner (IOS) and position measurement data is collected by tracking the IOS, for example, in some embodiments, the IOS includes a tracking element which produces position data.

In some embodiments, optical measurement data is collected using an Intraoral Scanner (IOS) and position measurement data is collected using a tracked measurement device which optionally includes a probe (in some embodiments, the probe is a stylus) where the probe is contacted to a portion of the patient's mouth to collect a position measurement of the portion. In some embodiments, the probe is contacted to subgingival areas of a tooth and, for example, is sized and/or shaped to be inserted and/or scanned along a subgingival tooth surface, for example, without causing damage to the gingiva.

In some embodiments, position measurement data is generated using at least two tracking elements where a first tracking element includes a source and a second tracking element includes a position sensor which senses a position of the source (e.g. emits a signal based on a position of the source). In some embodiments, the source includes a magnet, for example an electromagnet (e.g. transmitting an AC electromagnetic signal). In some embodiments, the position sensor is an electromagnetic sensor sensing a position of the source electromagnet (e.g. emitting a signal based on a sensed position of the electromagnet). A potential advantage of using electromagnet/s and/or electromagnetic sensors is increased accuracy over permanent magnet/s, for example, because of ambient magnetic fields.

In some embodiments, alternatively or additionally, the system includes ultrasonic tracking where the source is an ultrasonic transmitter and the position sensor is an ultrasonic position sensor and where, for example, time delays on a transmitted ultrasonic signal are used to measure position.

In some embodiments, a tracking element includes both a source and a position sensor e.g. the tracking element switching between emitting and receiving a signal and/or simultaneously emitting and receiving a signal.

In some embodiments, the tracked measurement device includes one or more tracking element and a measured position of the tracked measurement device is with respect to a second tracking element. In some embodiments, a second tracking element is attached to a subject (e.g. to the subject's mouth, herein termed "mouth tracking element").

Alternatively or additionally, in some embodiments, the tracked measuring device is tracked with respect to an additional tracking element not in contact with the subject (e.g. a "hub").

In some embodiments, measurement is of both a position of the measuring device and of a position of a tracking element attached to the subject's mouth with respect to a hub. For example, in some embodiments, measurement of position of the mouth tracking element (with respect to the hub) is used to correct position measurements of the tracked measuring device e.g. to correct for patient movements.

In some embodiments, an IOS includes a tracking element (e.g. mounted on and/or at least partially recessed inside the IOS). In some embodiments, both an optical data set and a position data set are collected by a same device and/or concurrently. For example, in some embodiments, a tracking element which collects the position data is affixed to an IOS which collects the optical data, for example, where the position data is associated with optical data collected at a particular time. In some embodiments, an add-on configured to be attached to an IOS includes one or more tracking element and a stylus configured for contacting portions of a patient mouth. In some embodiments, an add-on for an IOS includes a tracking element and does not include a stylus and/or a portion configured to contact mouth portion/s.

An aspect of some embodiments of the invention relates to an add-on device which includes one or more tracking element and a portion configured to be contacted to a patient's mouth (e.g. a stylus e.g. which is sized and/or shaped for insertion between a tooth and gingiva). In some embodiments, the add-on device is configured to be attached to an IOS. For example, the add-on device is sized and/or shaped for attachment to and/or includes a connector configured to attach the add-on device to one or more type of IOS. In some embodiments, attachment is such that the IOS is able to collect optical data regarding a position of the stylus (e.g. the stylus is in a field of view of the IOS). In some embodiments, the add-on device is incorporated into an IOS during manufacture of the IOS.

In some embodiments, two or more data sets are integrated (e.g. by a processor), where integrating includes aligning the data sets and/or combining the data sets. Where, for example, a first data set includes optical measurement data and a second data set includes position measurement data. In some embodiments, a second data set is used to correct a first data set. In some embodiments, a second data set is used to extend a first data set. Where, for example, the first data set is optical measurement data and the second data set is position measurement data.

In some embodiments, a dental measurement system analyzes (e.g. using a processor) two or more data sets and provides feedback (e.g. to a user) regarding one or more feature of the data. For example, in some embodiments, the system provides feedback as to whether sufficient position data (e.g. sufficient density of position measurement data for one or more mouth portion) has been collected. For example, in some embodiments, the system provides feedback as to whether two or more data sets are sufficiently aligned e.g. for registration.

An aspect of some embodiments of the invention relates to affixing one or more tracking element to a patient, for example, to a portion of a patient's mouth. In some embodiments, a tracking element is affixed (e.g. rigidly affixed) to one or more object within a patient's mouth, for example one or more tooth and/or implant abutment and/or post and/or crown, and/or bridge. In some embodiments, a tracking element is affixed to one or more mouth object (e.g. tooth) using adhesive. In some embodiments, a tracking element is affixed by a clamp, for example, a rubber dam clamp (e.g. the tracking element is attached to a clamp which is attached to one or more mouth object, e.g. a tooth). In some embodiments, the element is attached by a structure where a lumen of the structure is arranged around the tooth and reduced in size until the structure is attached onto the oral object/s (e.g. tooth).

In some embodiments, an adaptor including a tracking element is sized and/or shaped to fit onto one or more oral object (e.g. a tooth), for example, in some embodiments, a body of the adaptor is constructed (e.g. using 3D printing) using oral measurements (e.g. of a tooth). In some embodiments, the measurements are optical measurement data collected with an IOS.

In some embodiments, a tracking element is affixed using material and/or techniques used in collecting an impression. For example, in some embodiments, a tracking device is attached to one or more mouth objects using molding putty. For example, in some embodiments a tracking device is attached to a tray for collecting impressions and, optionally, the tray is affixed to mouth objects using molding putty. In some embodiments, collecting an impression (e.g. a tooth impression) is combined with attaching a tracking element. For example, in some embodiments, a tray for molding putty includes a tracking element. In some embodiments the tracking element is affixed to a night guard or a retainer (e.g. orthodontic retainer).

In some embodiments, an adaptor including a tracking element is attached to a dental implant, for example attached to an abutment and/or a post of a dental implant before a prosthesis is attached.

An aspect of some embodiments of the invention relates to tracking an IOS using one or more position sensor, and using collected position data of the IOS to correct a 3D optical data model collected by the IOS.

In some embodiments, the position measurement data is a three dimensional point cloud and the optical measurement data is a three dimensional point cloud. In some embodiments, the data clouds are aligned using one or more algorithm. In some embodiments, a course alignment algorithm is used followed by a fine alignment algorithm, e.g. ICP.

In some embodiments, optical measurement data is associated with position measurement data. For example, in some embodiments, an IOS collecting the optical data is tracked providing data on the same coordinate systems as the position measurement data collected by the tracked measurement device. In some embodiments, alignment is performed to improve the alignment of the data sets (e.g. in the case that the tracking calibration has error). For example, using a fine alignment algorithm e.g. ICP.

In some embodiments, an external tracker located external to the IOS and position measurement device (the tracker e.g. affixed to a patient's mouth and/or a hub tracker) is used to track both the IOS and the position measurement device. In some embodiments, the external tracker provides position data on the same coordinate system for both the optical measurement data and position measurement data. In some embodiments, any calibration errors are corrected e.g. using a fine algorithm such as ICP.

In some embodiments, a first data point cloud and a second data point cloud, where the two data point clouds are not on the same coordinate system (e.g. are not aligned) are combined. Where, in some embodiments, the first data point cloud is position measurement data and the second data point cloud is optical measurement data or vice versa.

In some embodiments, the second data point cloud is used to extend the first data point cloud. In some embodiments, extending includes merging the two point clouds into a third data point cloud which includes points from both the first and second data point clouds. In some embodiments, a meshing algorithm is performed on the third data point cloud (optionally after filtering the data point cloud) to generate a 3D model.

In some embodiments, the second data point cloud overlaps the first data point cloud.

In some embodiments, a decision mechanism is used to combine the two overlapping point clouds where, in overlapping areas points are selected (and others deleted) for the combined data set. In some embodiments, points are selected based on accuracy of the data points (e.g. one data cloud is considered to be more accurate than the other data cloud). In some embodiments, points are selected based on a density of the points.

Alternatively or additionally, in some embodiments, all of the data points of the overlapping data point clouds are added to a third data point cloud and points are selected (e.g. from overlapping areas) when a 3D meshing step is performed to arrive at a 3D model, from the data point cloud. Where, an exemplary 3D meshing algorithm is Delaunay triangulation. In some embodiments, a data point cloud (e.g. the third data point cloud) is filtered before meshing e.g. to make a single layer mesh.

In some embodiments, a 3D model (e.g. of optical data e.g. received from an IOS and/or from a memory) is combined with a data point cloud (e.g. of position measurement data).

In some embodiments, the 3D model includes a 3D mesh.

In some embodiments, points of the point cloud are aligned to the mesh and a meshing algorithm (e.g. ICP) is then performed again to generate a 3D model of the combined data. In some embodiments, a filtering operation is performed on the points of the point cloud.

In some embodiments, a point cloud is extracted from the 3D model and then the two point clouds are combined (e.g. including one or more feature as described above).

In some embodiments, a tracker (e.g. affixed to a portion of a subject's mouth) includes one or more fiducial mark. In some embodiments, optical measurement/s of the fiducial mark (e.g. using an IOS) are aligned to a coordinate system of the tracker using the optical measurement/s of the fiducial mark.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Method of Dental Measurement

FIG. 1A is a flow chart of an exemplary method of dental measurement, according to some embodiments of the invention.

At 100, in some embodiments, optical data is collected, for example, from optical measurement of at least a portion of a patient's mouth. In this document, "at least a portion of a patient's mouth" is also termed "mouth portion".

In some embodiments, optical data is collected using an IOS.

For example, in some embodiments, an IOS projects structured light onto a portion of the mouth to be measured (where structured light is, for example, light with a pattern, where the pattern is known). In some embodiments, the IOS collects visual images of the mouth portion illuminated with the structured light, extracts a pattern of the structured light incident on the mouth portion, and infers 3D information regarding topography of the mouth portion from deformation of the pattern of the structured light incident on the mouth portion as compared with the structure of the projected light.

In some embodiments, an optical data 3D model is obtained by using depth camera, for instance using structured light. In some embodiments, a plurality of depth images are combined together to generate the 3D model.

For example, in some embodiments, an IOS (alternatively or additionally to using structured light) includes more than one camera where the cameras are orientated on the IOS such that the cameras have different views of the mouth portion. In some embodiments, 3D information regarding topography of the mouth portion is inferred by comparing the different views of the mouth portion collected by the cameras.

For example, in some embodiments, an IOS (alternatively or additionally to using structured light and/or different camera views) collects 3D measurements using confocal techniques where, for example, camera/s of the IOS collect images of a mouth portion at different focal distances from the mouth portion (e.g. by focusing the camera/s at different focal distances) and 3D information regarding topography of the mouth portion is inferred from the collected images.

In some embodiments, e.g. for one or more of the IOS data collection techniques described above, inferred 3D information is used to generate a 3D model of the mouth portion. In some embodiments, the model includes a 3D surface of the mouth portion. In some embodiments, the 3D information includes discrete data points.

In some embodiments, an IOS is moved around inside a patient's mouth to collect measurements of different portions of the mouth. In some embodiments, the measurement data, from different portions of the mouth is combined to create a single 3D model (which, for example, includes a 3D surface) of at least a portion of the mouth.

In some embodiments, more than one IOS is used to collect optical measurement data, where, for example, a first optical data set is collected using a first IOS and a second optical data set is collected using a second IOS.

In some embodiments, the first IOS is a full jaw scanner and the second IOS is a subgingival IOS e.g. an IOS including an elongated element sized and/or shaped for insertion subgingivally (e.g. between a tooth and a portion of surrounding gum), the subgingival IOS including one or more feature as described elsewhere within this document and/or illustrated in accompanying features. Optionally, in some embodiments, the first optical data set and the second optical data set are integrated to form a 3D model of at least a portion of a patient's mouth.

In some embodiments, one or both of the first and second IOS includes a tracking element. In some embodiments, position data collected by the tracking element/s is used when integrating the first and second optical data sets. In some embodiments two or more (e.g. one on each IOS) IOS tracking elements are calibrated together. In some embodiments one IOS is optimized for a full jaw scan and the second IOS is a subgingival scanner, for instance using an elongated element coupled to and/or attached to the second IOS.

In some embodiments, (additionally or alternatively to using an IOS) optical data is collected using other measurement device/s. For example, one or more of ultrasound, x-ray, CT, MRI. In some embodiments, optical measurement data is received from a data source e.g. stored ultrasound and/or x-ray and/or CT and/or MRI data and/or IOS data.

In some embodiments, optical data only includes measurements of visible portions of the mouth, for example, of visible tooth portions. For example, in some embodiments, optical data collected by an IOS includes visible portions of the mouth e.g. supragingival portions of teeth, gingiva.

Alternatively, in some embodiments, optical data includes (e.g. additionally to visible portions of the mouth), subgingival portions of the mouth, e.g. subgingival tooth portion/s. The data collected, for example, by exposing the portions (e.g. by cord packing) and/or using non-invasive imaging techniques (e.g. x-ray, ultrasound, CT, MRI).

In some embodiments, one or more optical measurement is collected of a one or more reference, e.g. a reference within the patient's mouth and/or on the patient and/or external to the patient. For example, in some embodiments, a reference is an object attached to the patient (e.g. within the patient's mouth). For example, in some embodiments, a position of a tracking element mounted within the mouth is optically measured. In some embodiments, optical measurement of one or more reference (e.g. a tracking element) is used to align optical measurement data and position measurement data. For example, where, position of reference/s is measured in more than one data set (e.g. in position measurements and in optical measurements) and the position of the reference/s is used to align the two data sets. In some embodiments, position of reference/s are measured in three or more data sets, and are used to align the data sets (e.g. one or more reference is radiopaque, reference/s used to align a third data set including CT and/or x-ray images with optical (first data set) and/or position data (second data set)).

At 106, in some embodiments, position data is collected.

In some embodiments, a portion of a tracked measurement device (for example stylus 1106 FIG. 11 and/or stylus 1206 FIG. 12, 1306 FIG. 13, 1506 FIGS. 15A-B) is contacted to a portion of the patient's mouth and a position data measurement is taken, e.g. using one or more position sensor. In some embodiments, the position measurement data relates to a position of the portion of the tracked measurement device in contact with the patient's mouth e.g. with respect to a reference point.

In some embodiments, the tracked measuring device includes a stylus and position data relates to a position of the stylus and/or a position of a portion of the stylus e.g. a tip of a stylus.

In some embodiments, the tracked measurement device includes one or more tracking element, which in some embodiments includes one or more position sensor which produces position data (e.g. an electromagnetic position sensor). Alternatively or additionally, in some embodiments, a position of the tracking element is detected by a position sensor external to the tracked measurement device. For example, in some embodiments, the tracking element includes a magnet (e.g. an electromagnet) the position of which is measured by a magnetic position sensor external to the tracked measurement device.

In some embodiments, additionally or alternatively to a magnetic position sensor, the tracked measurement device includes a gyroscope and/or accelerometer.

In some embodiments, position data includes measurement of subgingival portions of the mouth, for example, measurement of subgingival tooth portion/s and/or pocket depth. For example, in some embodiments, position data includes data relating to a position of a tip of a stylus inserted subgingivally (e.g. contacting a subgingival portion of a tooth).

Additionally or alternatively, in some embodiments, position data includes supragingival measurement data.

In some embodiments, the tracked measurement device is scanned over mouth portion/s, where, for example, a stylus contacting a tooth surface is moved along the surface (e.g. while staying in contact with the surface) while position data is collected.

Optionally, in some embodiments, at least a portion of the movement of the tracked measurement device is automatic. For example, in some embodiments, a vibrating stylus is manually moved around the mouth. In some embodiments, a vibrating stylus vibrates in a direction of a long axis of the stylus (which, for example, in some embodiments, corresponds to an apical-coronal direction), for example, while the stylus is moved around a tooth (e.g. manually). In some embodiments, additionally or alternatively, the stylus vibrates in a direction at an angle to a long axis of the stylus (e.g. perpendicular to the long axis of the stylus). In some embodiments, scanning and/or vibration of the stylus is as described in documents incorporated by reference into this document.

In some embodiments, position data includes one or more discrete points. For example, in some embodiments, the tracked measurement device is contacted to the patient's mouth (e.g. a point on a tooth), a position measurement is collected and then the tracked measurement device is moved (e.g. out of contact with the patient's mouth) and repositioned to collect another data point.

Alternatively or additionally, in some embodiments, position data includes one or more contour. In some embodiments, the tracked measurement device is scanned over a portion of the mouth, for example, contacted to a portion of the mouth (e.g. a tooth) and then moved whilst in contact with the mouth (e.g. contacted to a tooth and moved whilst in contact with the tooth). In some embodiments, the resolution of the position data depends on the speed of movement of the tracking device. In some embodiments, contours are collected using a tracked measurement device with a vibrating stylus (e.g. as described elsewhere in this document and/or in the documents incorporated by reference).

In some embodiments, position measurement data includes, a measurement of a level of contact between the stylus and the mouth portion. For example, in some embodiments, a tracked measurement device includes one or more sensor (e.g. as described in more detail regarding sensor 1344, FIG. 13) configured to measure a level of contact between the stylus and object which the stylus is measuring (e.g. tooth).

In some embodiments, a 3D position data model is generated from collected position data. For example, in some embodiments, a 3D surface is generated by interpolating between collected position measurement data points and/or contours.

In some embodiments, one or more position measurement is collected of a one or more reference, e.g. a reference within the patient's mouth and/or on the patient and/or external to the patient. For example, in some embodiments, a reference is an object attached to the patient (e.g. within the patient's mouth).

In some embodiments, the reference is a tracking element within the mouth, for example, as described regarding step 104. In some embodiments, all position measurements are with respect to a reference e.g. with respect to a mouth tracking element.

Figure 7:
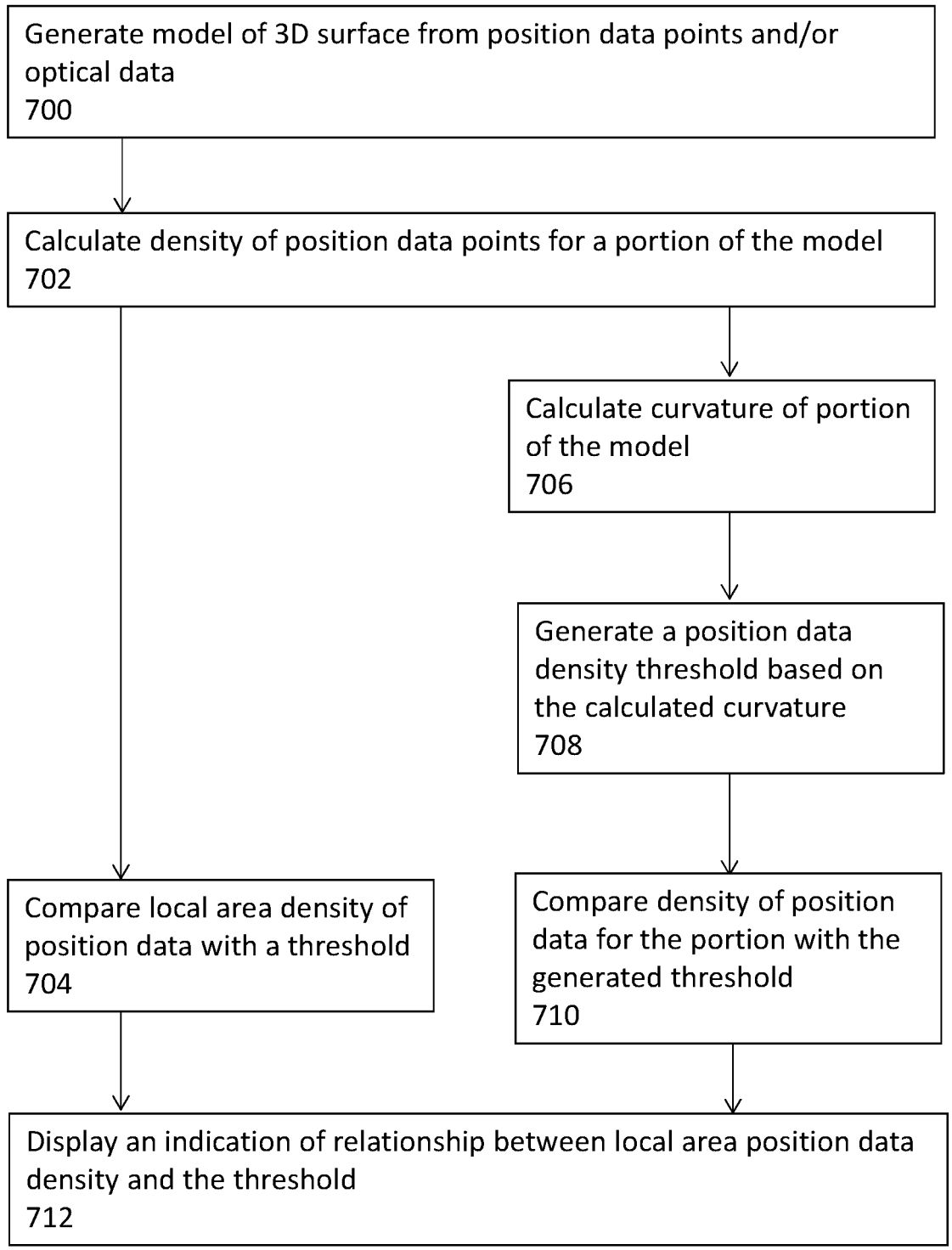
FIG. 7 is a flow chart of an exemplary method of providing data density feedback, according to some embodiments of the invention.

In some embodiments, feedback is calculated and/or provided during and/or after position measurement (e.g. as described regarding FIG. 7). For example, feedback as to whether the collected data is sufficient (e.g. sufficiently dense and/or of sufficient extent) e.g. for a particular purpose and/or for a data collection mode (e.g. a selected mode).

In some embodiments, measurement (and/or a portion of measurements optical and/or position) are not taken from the patient directly. For example, in some embodiments, measurement data is collected from a dental impression and/or from a cast made from a dental impression.

In some embodiments, steps 100 and 106 happen with a short (and/or no time separation). For example, in some embodiments, optical data and position data are collected simultaneously (e.g. by the same device which includes both optical sensor/s and tracking element/s).

Alternatively, or additionally, in some embodiments, at least a portion of optical data and/or position data is collected at different times and/or by different devices. In some embodiments, optical data and position data are collected at different times (e.g. sequentially, alternatively) by the same device. In some embodiments optical data is collected at a different time and/or place from position data (e.g. at a previous dental appointment, e.g. optical data is collected by a third party).

At 108, the optical data is integrated with the position data (e.g. as described regarding FIGS. 2-6).

Figure 1B:
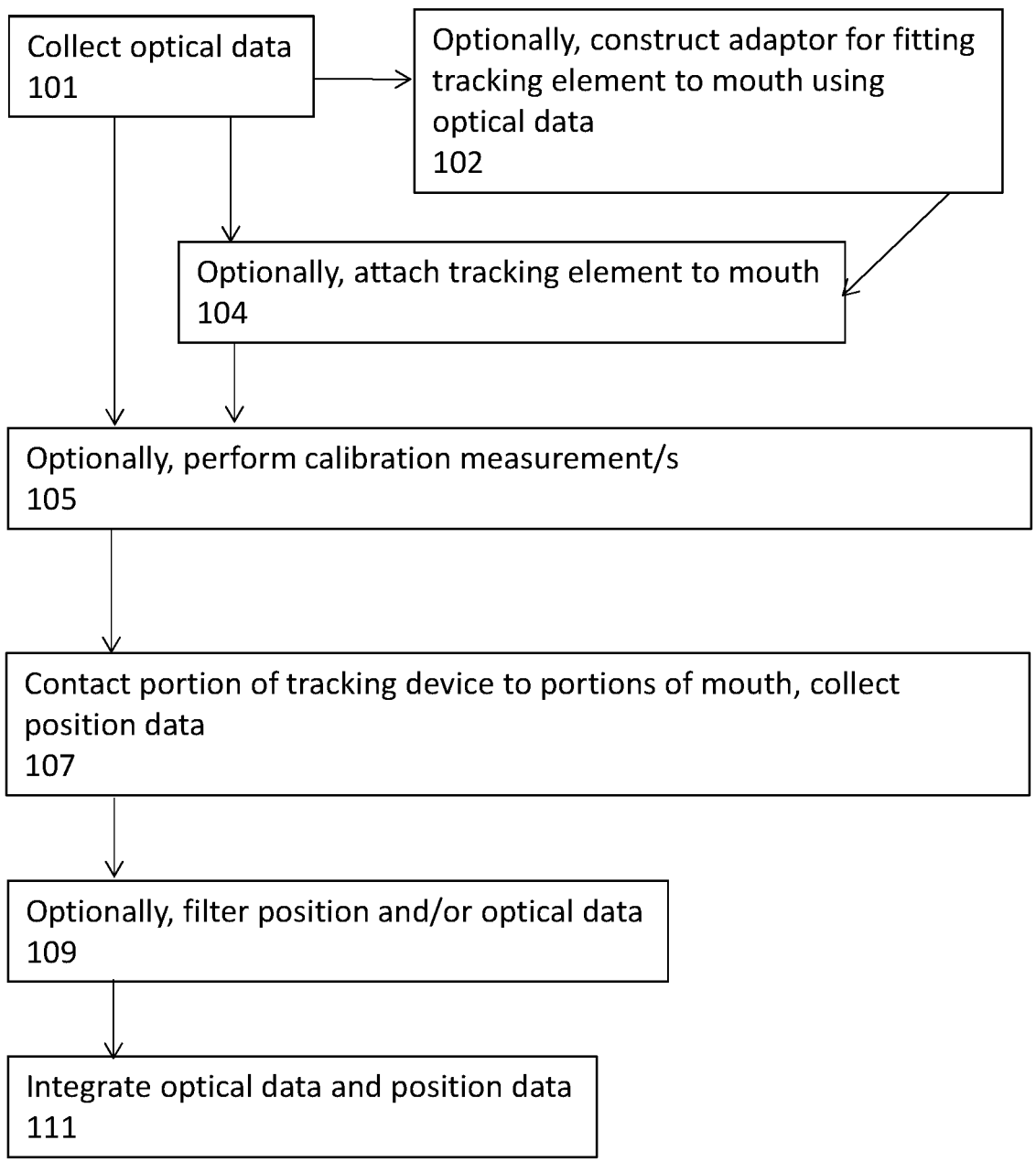
FIG. 1B is a flow chart of an exemplary method of dental measurement, according to some embodiments of the invention.

FIG. 1B is a flow chart of an exemplary method of dental measurement, according to some embodiments of the invention.

At 101, in some embodiments, optical data is collected, e.g. as described regarding step 101 FIG. 1A.

Optionally, at 102, in some embodiments, an adapter for a tracking element is constructed (e.g. by 3D printing, e.g. as described regarding and/or illustrated by FIG. 21) using previously collected optical data (e.g. data collected by IOS at 100, and/or e.g. as described hereinbelow with reference to FIG. 14).

At 104, optionally, in some embodiments, one or more tracking element is affixed to a portion of a patient's mouth (herein termed "mouth tracking element") (e.g. as described regarding and/or illustrated by FIGS. 17-24). In some embodiments, the mouth tracking element includes one or more position sensor and/or one or more magnet. In some embodiments, the tracking element is affixed to the patient's mouth using an adapter, e.g. as described above regarding step 102.

In some embodiments, optical data is collected after a tracking element is affixed to a patient's mouth. For example, alternatively and/or additionally to optical data collection prior to affixing the tracking element.

Alternatively, in some embodiments optical data is only collected after a tracking element has been affixed to the patient's mouth.

At 105, optionally, in some embodiments, before (and/or during) collection of position measurement data, calibration measurement/s are collected.

In some embodiments, a tracked measurement device is calibrated. Where, for example, a position of a portion of a tracked measurement device (e.g. stylus, e.g. tip of a stylus) with respect to sensor/s generating measurement data is measured. The measurement/s, for example enabling a real space location of the portion tracked measurement device to be inferred from sensor data.

In some embodiments, position measurements are used to calibrate a tracked measurement device. For example, in some embodiments, a location of the stylus (e.g. a tip of the stylus) is calibrated with the tracking system sensor/s (e.g. with a tracking system coordinate system). For example, in some embodiments, by contacting the tip of the stylus (e.g. one or more times) to one or more known reference whilst collecting position measurement/s. In some embodiments, the reference/s are tracking elements in the system (e.g. a mouth tracking element and/or hub).

In some embodiments, optical measurements are used to calibrate a position of a stylus (e.g. a stylus tip) with respect to one or more tracking element. In some embodiments, a position of a stylus and a position of a tracking element are identified using a 3D imager (e.g. an imager of an external calibration system). Where the measurements are used to calibrate the relative location of the tracking element and the stylus, e.g. in 6 DOF.

In some embodiments, optical measurements are used to calibrate an IOS. For example, in some embodiments, one or more image is collected of a stylus of an add-on by an IOS to which the add-on device is attached. In some embodiments, position of the stylus (e.g. a position of the stylus tip) with respect to the optical sensors in the IOS is inferred (e.g. calibrated) from the collected image/s. In some embodiments, the stylus is calibrated to the tracking system, (position of stylus is known with respect to the tracking system)

and the collected images are used to register an IOS measurement coordinate system to a tracking system coordinate system.

For example, in some embodiments, an IOS collects an image including one or more reference of known position in the tracking system (e.g. the reference is a tracking element). In some embodiments, a spatial relationship between the IOS and the tracking element is inferred from the image, for example, enabling an IOS coordinate system to be registered to a tracking system coordinate system.

At 107, in some embodiments, position data is collected (e.g. as described regarding step 106, FIG. 1A).

At 109, in some embodiments, collected data is filtered. For example, in some embodiments, data collected using position sensors is filtered using contact sensor information, where, for example, only position measurements where a contact sensor (e.g. contact sensor 1344 FIG. 13) indicates a sufficient level (e.g. by comparison with a threshold) of contact between the stylus and the mouth portion being measured (e.g. tooth or teeth) are retained and/or used (e.g. for generating and/or augmenting and/or correcting a 3D model e.g. as described in FIGS. 2-7).

At 111, in some embodiments, optical data and position data are integrated (e.g. as described regarding FIGS. 2-6).

Figure 2:
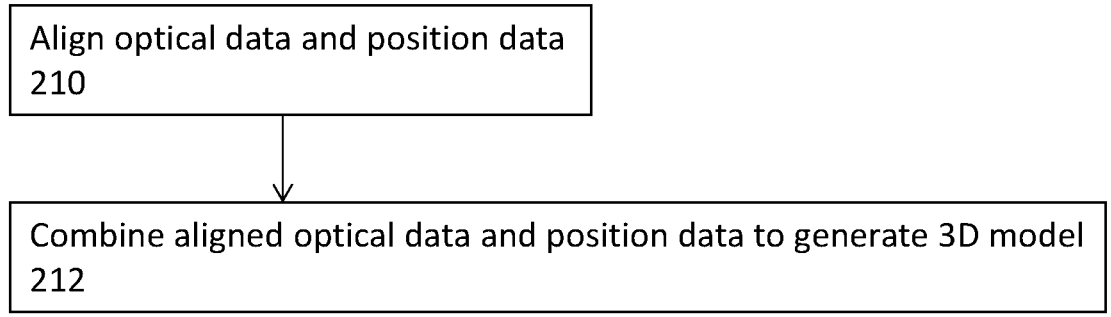
FIG. 2 is a flow chart of an exemplary method of integrating optical and position data, according to some embodiments of the invention.

FIG. 2 is a flow chart of an exemplary method of integrating optical and position data, according to some embodiments of the invention.

In some embodiments, integration of two data sets (e.g. an optical measurement data set and a position measurement data set) includes, at 210, spatially aligning the two data sets e.g. in 6 degrees of freedom (DOF).

In some embodiments, at 212, the data sets are combined, for example, into a single 3D model. In some embodiments, two data sets are combined, for example, an optical data set e.g. collected by an IOS and a position measurement data set, e.g. collected by a tracked measurement device (e.g. tracked measurement device 1152 FIG. 11 and/or 1252 FIG. 12 and/or 1300 FIG. 13). In some embodiments, more than two data sets are combined, for example, more than one optical and/or position data set (e.g. data sets from different devices and/or measurements taken at different times).

In some embodiments, two data sets are aligned using topographical similarity between the data sets.

For example, in some embodiments, aligning includes comparing topography (e.g. 3D topography) between the two data sets and combining the two data sets for an alignment where there is a minimum discrepancy between the data sets.

For example, in some embodiments, aligning includes identifying one or more portion of both data sets with a similar topography and using the portion/s to align the remaining data.

For example, in some embodiments, aligning includes identifying one or more feature appearing in both data sets and aligning the data sets using the feature. In some embodiments, a feature identified in both of two data sets is used to fit the data sets, for example, using a random sample consensus RANSAC algorithm.

In some embodiments, data collected from non-overlapping portions of a subject's mouth (e.g. segment/s of a subject's jaw) are registered. For example, by registering the non-overlapping data sets to a global coordinate system. For example, the coordinate system of a hub (e.g. hub 1226 FIG. 12) and/or of a tracking element and/or of optical measurement/s. In some embodiments, data collected from non-overlapping portions of a subject's mouth is displayed (e.g. to a user, e.g. on a user interface) on the same coordinate system. For example, when scanning a few segments of a subject's jaw, those segments are displayed together on the same spatial location that they are located on the jaw, even though there is no overlap between them. In some embodiments, other oral feature/s are displayed at their 3D spatial location, even in cases where there is no overlap in the scans data. A potential advantage of displaying the non-overlapping portions being assisting a user to collect measurements from non-measured area/s.

In some embodiments, a dental measurement system (e.g. including one or more feature as described within this document) enables pause and resumption of measurements (e.g. collected by the same measurement device), where tracking is used to align a first data set (collected before pausing) and a second data set (collected after pausing). In some embodiments, the first and second data sets are aligned using data from tracking element/s e.g. connected to a dental measurement device collecting the data sets and/or using position data from a hub.

In some embodiments, position tracking measurements are used to provide an initial guess of position/s of a measurement device in a coordinate system, and optical measurements (2D and/or 3D) are used to accurately register data collected by the measurement device to the coordinate system e.g. to correct the initial guess. In some embodiments, Iterative Closest Point (ICP) algorithm is uses to accurately register the data, e.g. using initial guess data.

In some embodiments, for example, where a first data set extends an extend of a second data set, overlapping portions of two data sets are used to align the data sets. In some embodiments, for example, potentially enabling alignment, overlapping portion/s include points which are not on the same plane. In some embodiments, a first measurement data set (e.g. optical measurements) covers a first region, and a second measurement data set (e.g. position measurements) covers a second region where the first and second regions overlap, the overlapping portions are used to align the data sets.

In some embodiments, position data collected by a tracked measurement device is aligned with optical data (e.g. collected by an IOS). In some embodiments, alignment is by registering a coordinate space of the IOS with a coordinate space of the tracked measurement device. For example, in some embodiments, an optical measurement (e.g. image) is collected (e.g. by an IOS) when a portion of a tracked measurement device (e.g. a stylus) is contacted to a visible portion (e.g. supragingival) of a subject's mouth where, in some embodiments, the image includes the contact point between the tracked measurement device and mouth portion. In some embodiments, at least one optical measurement is collected for at least one contact point. In some embodiments, at least one optical measurement is collected for 2-10 or lower or higher or intermediate ranges or number of contact points. In an exemplary embodiment, at least one optical measurement is collected for at least 6 contact points.

In some embodiments, additionally or alternatively, the data sets are pre aligned by calibration between measurement devices and/or registration of one device to a coordinate system of another device and/or registration of one device coordinate system to another device's coordinate system.

For example, in some embodiments, optical data and position data are collected by the same device. For example, in some embodiments, a tracking system is registered and/or calibrated to an IOS device coordinate system, for example, in some embodiments, a position of one or more tracking element (e.g. mouth tracking element) is optically measured by the IOS. For example, in some embodiments, position measurement data is collected after registering the tracked measurement device collecting the position measurement data set with a co-ordinate system of the optical data.

Additionally or alternatively, in some embodiments, one or more reference which has been measured both optically and by position measurements (e.g. reference appears in both data sets) is used to spatially align the data sets.

In some embodiments, once the two data sets are aligned they are then combined where, for example, discrepancies between the two data sets are resolved to produce a single 3D model of the mouth portion.

In some embodiments, position measurement data is used to correct optical measurement data. For example, in some embodiments, accumulated error in optical measurement data is corrected using position measurement data.

In some embodiments, a first data set and a second data set are averaged to produce a 3D model. In some embodiments, if discrepancy between the data sets is above a threshold, for example, for one or more region of the data, an alert is provided e.g. to a user. In some embodiments, if a discrepancy between the data sets is above a threshold, one of the data sets is relied on for generating the 3D model.

Figure 3A:
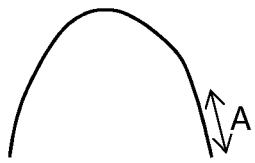
FIG. 3A shows a first data set, for a measured contour, according to some embodiments of the invention.
Figure 3B:
FIG. 3B shows a second data set, for a measured contour, according to some embodiments of the invention.
Figure 3C:
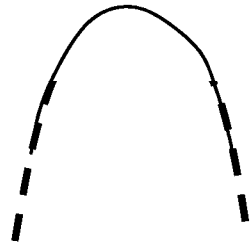
FIG. 3C shows a model of a contour, according to some embodiments of the invention.

Alternatively, in some embodiments, a first data set is augmented by a second data set, where the first data set is extended by data points outside a region of the first data set (e.g. as illustrated in FIGS. 3A-C). In some embodiments, one data set is not corrected or changed by the other data set.

FIG. 3A shows a first data set, for a measured contour, according to some embodiments of the invention. FIG. 3B shows a second data set, for a measured contour, according to some embodiments of the invention. FIG. 3C shows a model of a contour, according to some embodiments of the invention. In some embodiments, the model illustrated in FIG. 3C is generated by aligning the first data set illustrated in FIG. 3A and the second data set illustrated in FIG. 3B using overlapping regions A and B.

In some embodiments, a second data set is used to correct a first data set where, for example, the first data set is optical measurement data and the second data is position data.

Figure 4:
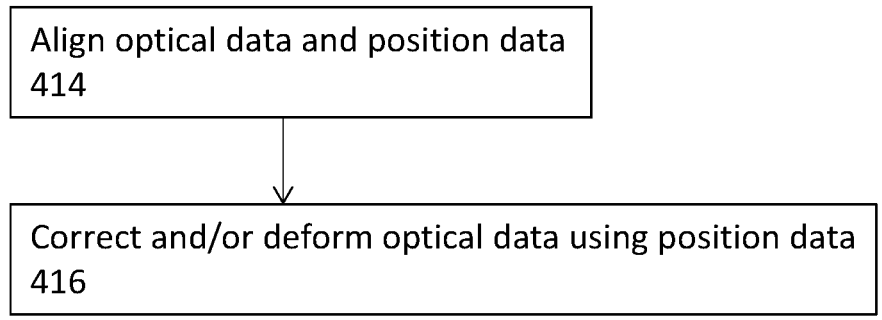
FIG. 4 is a flow chart of an exemplary method of integrating optical and position data, according to some embodiments of the invention.

FIG. 4 is a flow chart of an exemplary method of integrating optical and position data, according to some embodiments of the invention. In some embodiments, at 414, optical measurement data and position measurement data are aligned. At, 416, in some embodiments, the optical data is corrected and/or deformed (e.g. the surface of an optical data 3D model is deformed) based on the position data. In some embodiments, correction includes scaling the optical data.

In some embodiments, additional information is used to align the data sets, for example one or more of a general orientation of the data (e.g. coronal-apical direction), gyroscopic information, user input information. In some embodiments, the additional information is supplied with one or more of the data sets.

Figure 5:
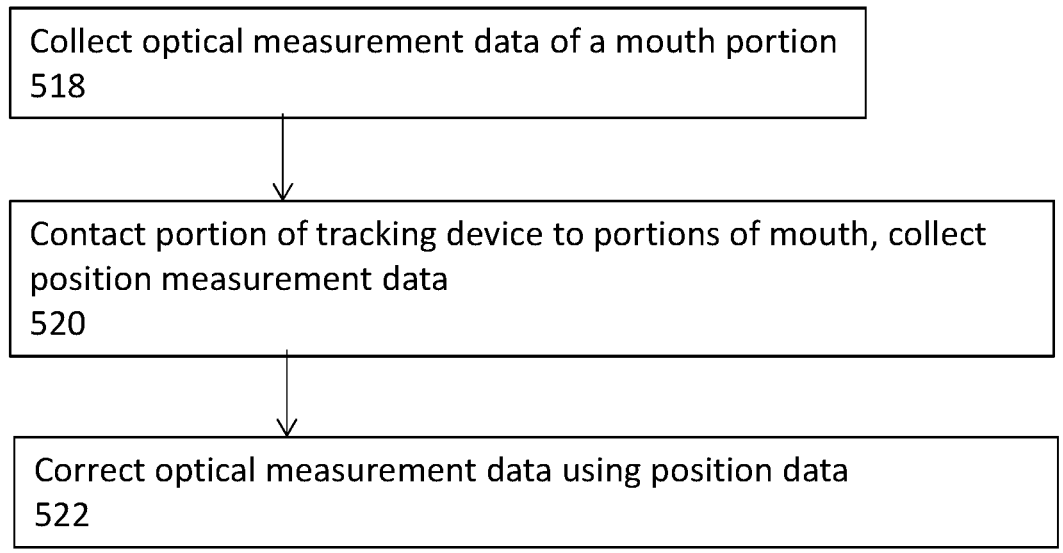
FIG. 5 is a flow chart of a method of mapping a mouth portion, according to some embodiments of the invention.

FIG. 5 is a flow chart of a method of mapping a mouth portion, according to some embodiments of the invention. In some embodiments, position data measurements are used to correct errors in optical measurements (e.g. using an IOS) accumulated over larger scan areas.

In some embodiments, the first data set is optical measurement data which has been collected with an IOS, where the optical data has an accumulated error which is accumulated in the process of stitching a plurality of small depth scans (e.g. of teeth) into a single 3D optical data model. In some embodiments, the second data set is position data which optionally lacks the detail (e.g. measurement density) of the optical data. In some embodiments, position measurements lack measurement density of optical data and/or local accuracy of optical data, for example, to shorten scan time. In some embodiments, a method of scanning includes identifying suitable scan density and/or resolution and/or amount of data points for optical and/or position data, to provide a desired resolution model (e.g. 3D model) with, for example, a short optical and/or position measurement scan time.

In some embodiments, the second data set is used to correct the accumulated error in the 3D optical data model. For example, in some embodiments, the accumulated error of an IOS 3D model extending for a distance of, for example, a full arc scan is 0.5-1 mm, while, in some embodiments, the accuracy of a tracking system (e.g. including a tracked measurement device e.g. as described herein) over the same distance is about 10 μm. In some embodiments, only enough position data is collected to correct the optical measurement model, where for example, the system provides feedback as to how much position measurement is required.

In some embodiments, at 518 optical measurements are collected of a mouth portion (e.g. more than one tooth, e.g. 2-5 teeth, e.g. half a jaw, e.g. a whole jaw). In some embodiments, at 520 position data is collected. In some embodiments, (e.g. when a single device includes an IOS and a tracker) both position and optical data are collected simultaneously. In some embodiments, at 522 optical measurement data is corrected using position data.

For example, in some embodiments, position data is used to correct accumulated measurement error of IOS collected optical data (e.g. due to limited field of view of the IOS) of a full jaw arc (and/or a half jaw arc) from about 0.5-1 mm to below 0.5 mm, or below 0.1 mm, or less than 0.05 mm, or less than 0.03 mm, or less than 0.01 mm, or lower or higher or intermediate values or ranges.

In some embodiments, accumulated error for optical measurement is associated with stitching together multiples scans (e.g. associated with the small FOV of IOS devices) where combining of two sets of optical data (stitching) introduces an alignment error, for example, associated with inaccuracy of matching the two optical data sets with each other. In some embodiments, for example, if a 3D optical measurement model includes a plurality of stitched together data sets, in some embodiments, alignment errors accumulate.

Exemplary Feedback

Figure 6:
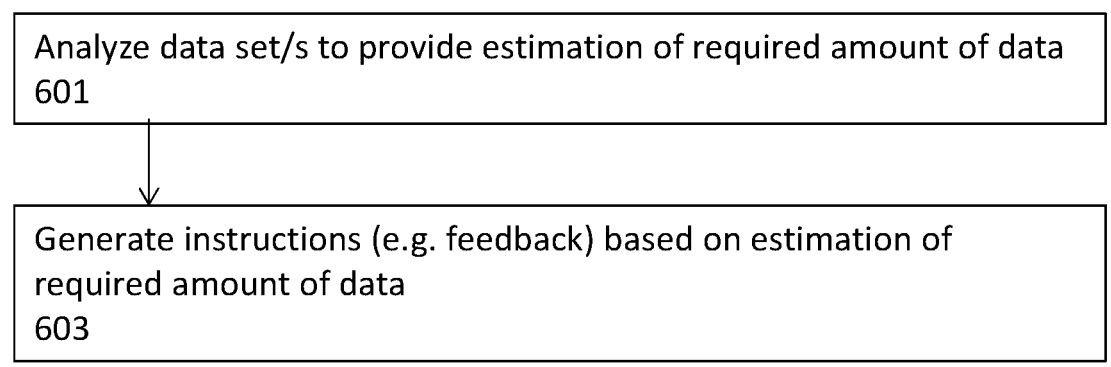
FIG. 6 is a flow chart of a method of analyzing measurement data, according to some embodiments of the invention.

In some embodiments, for example after and/or during collection of dental measurements, measurement data is analyzed. FIG. 6 is a flow chart of a method of analyzing measurement data, according to some embodiments of the invention.

In some embodiments, analysis provides feedback as to whether sufficient measurements have been collected. For example, at 601, in some embodiments, one or more data set is analyzed to provide an estimation of a required amount of data (e.g. for a specific purpose). For example, in some embodiments, a first and a second data set (e.g. an optical measurement data set and a position measurement data set) are compared to analyze whether there is sufficient data in one and/or both data sets to align the data sets, e.g. to provide confident alignment in 6 DOF between the sets. For example, in some embodiments, spatial location of data points in the different sets are analyzed to ascertain if there are enough points of each data set in sufficiently different planes e.g. allowing accurate 6DOF alignment of the data sets. For example, in some embodiments, possible alignments are analyzed to identify if a number of possible alignments is excessive (e.g. exceeds a threshold) and/or to identify if a difference between topographies of different possible alignments is excessive (e.g. exceeds a threshold).

For example, in an exemplary embodiment, a position measurement data set is analyzed to indicate whether enough position measurements (e.g. enough position measurements overlapping with optical measurement data) have been collected to align the position measurements with a pre-existing measurement data set (e.g. previously collected optical measurement data). For example, in some embodiments, as optical and position measurements are collected (e.g. by a single device), the measurements are analyzed to estimate whether sufficient position data measurements have been collected to correct the optically collected measurements. In some embodiments, analysis provides an estimate as to whether enough position measurements have been collected of a particular portion of the mouth, e.g. a finish line of a prepared tooth (e.g. prepared for receiving a prosthetic).

In some embodiments, analysis provides an estimate as to whether enough position measurements have been collected for a high enough resolution model to be generated, e.g. where the model fulfils resolution requirements e.g. for generating a prosthetic.

In some embodiments, analysis provides an estimate as to whether coverage a portion of the mouth being measured (e.g. a tooth or teeth) is sufficient, for example as to where there are holes and/or low measurement density area/s of the model. In some embodiments, analysis provides an estimate as to whether a finish line of a tooth and/or teeth has been measured and/or measured with sufficient density of measurements.

In some embodiments, analysis provides an estimate as to whether a density of position measurement data is sufficient.

In some embodiments, at 603 instructions are generated, based on the estimation, for example, in some embodiments, feedback is provided to a user, e.g. through a user interface.

FIG. 7 is a flow chart of an exemplary method of providing data density feedback, according to some embodiments of the invention.

At 700, in some embodiments, a model of 3D surface is generated. In some embodiments, the model is generated using measured position data points, using, for example, interpolation and/or fitting and/or spatial filtering between data points. Additionally or alternatively, the model is generated using optical measurement data.

At 702, in some embodiments, a density of collected position data points is calculated for a portion of the model.

At 704, in some embodiments, the calculated density is compared with a threshold.

In some embodiments, a density threshold, for example, for a portion of the model, is generated using a curvature of the portion of the model.

For example, in some embodiments, at 706, a local curvature of the portion of the model is calculated.

In some embodiments, at 708, a position data density threshold is generated, based on the calculated curvature. Where the generation is, for example, using a look up table and/or by multiplying the calculated curvature by a constant. In some embodiments, the generated threshold is alternatively or additionally generated based on the mouth object being measured and/or the intended use for the measurement data (e.g. in some embodiments, specific prosthetics require a defined accuracy of measurement).

In some embodiments, at 710, the density of position data for the portion of the model is compared with the threshold.

At 712, in some embodiments, an indication of a relationship between the calculated density and the threshold is displayed, for example, to a user e.g. on a user interface. For example, if the density is not sufficiently high, a user interface can display an indication to a user to collect more position data e.g. during and/or after initial collection of data. In some embodiments, the threshold is a stored value. In some embodiments, the threshold depends on the purpose of the measurements, for example, in some embodiments, the threshold reflects the measurement density required for use of the collected data in construction of a prosthetic. In some embodiments, a threshold is area specific, for example, different portions of a tooth having different measurement density requirements. For example, in some embodiments, visible portions of the tooth requiring a lower position measurement density (e.g. as optical measurement data is available) than subgingival portions.

In some embodiments, analysis provides feedback as to whether optical measurement data and position measurement data are sufficiently aligned (e.g. measurement devices are calibrated sufficiently accurately) to be combined into a single 3D model (e.g. of sufficient accuracy e.g. for a particular purpose).

In an exemplary embodiment, if an optical measurement 3D model deviates from a position measurement 3D model, at each point on the model by less than a threshold, or each position measurement data point deviates for the optical measurement 3D model by less than a threshold, then a combined model is generated and/or an indication is displayed to a user that the position measurements are sufficiently and/or are sufficiently accurate. Where, for example, the threshold is deviation of, for example less than 100 µm, less than 50 µm, less than 30 µm, or 10-200 µm, or 20-70 µm or lower or higher or intermediate measurements or ranges In some embodiments, if an error between a position data point and a 3D optical measurement model is more than 100 µm, more than 50 µm, more than 20 µm, or 10-200 µm, or 30-70 µm or lower or higher or intermediate measurements or ranges, and/or if more than 2, or more than 3 or more than 4 or more than 5 or 1-5, or 1-10, or 2-4 position measurement data points are outside this error, an indication is displayed to a user that the position data is not sufficiently aligned with the optical measurement model.

In some embodiments, once a sufficient amount of position measurements are collected, e.g. to align the optical measurement 3D model and/or to provide sufficient coverage of one or more scanned tooth, one or more indication is displayed to a user.

Exemplary Tracking Element, Exemplary Tracking System

In some embodiments, a tracking element includes a magnet. In some embodiments, the tracking element is an electromagnet, the electromagnet, for example, including at least one coil with a current supply e.g. a AC current supply which generates an AC electromagnetic field. In some embodiments, a tracking element produces a spatially variable electromagnetic field distribution with time, e.g. the electromagnet includes more than one coil.

In some embodiments, a tracking element includes an ultrasonic transmitter.

Figure 8:
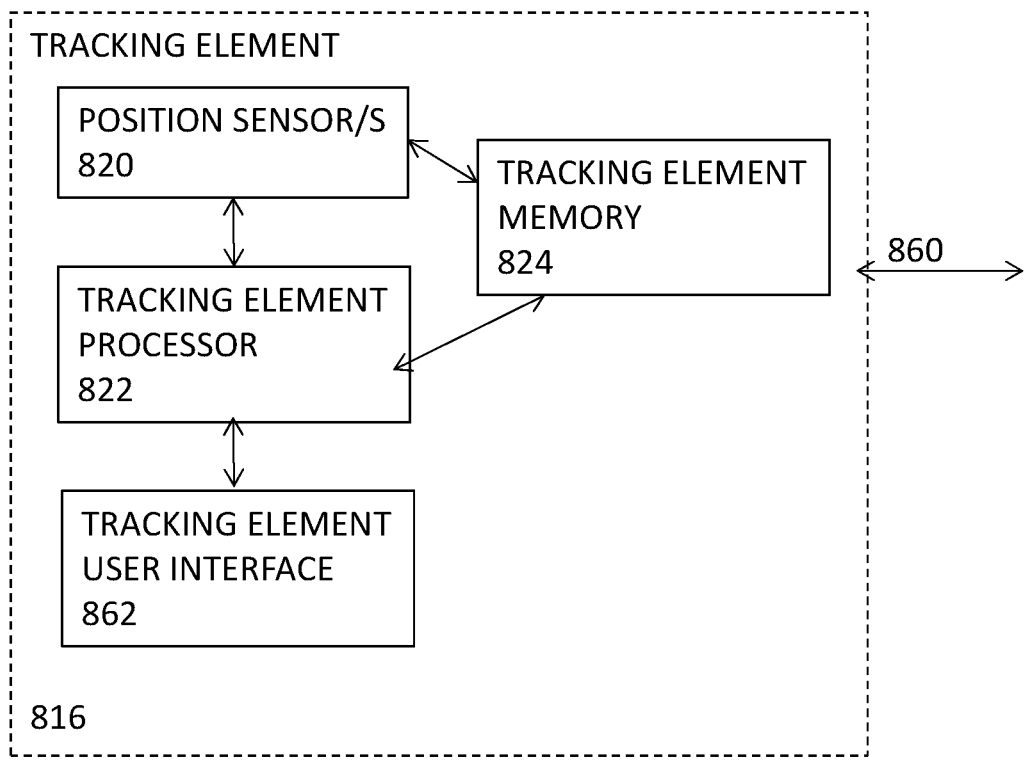
FIG. 8 is a simplified schematic block diagram of a tracking element, according to some embodiments of the invention.

Alternatively or additionally, in some embodiments, a tracking element includes a position sensor. FIG. 8 is a simplified schematic block diagram of a tracking element 816, according to some embodiments of the invention. In some embodiments, tracking element 816 includes one or more position sensor 820 (e.g. electromagnetic position sensor) where the position sensor/s 820 sense a position of the tracking element with respect to another tracking element (e.g. an electromagnet transmitting an AC magnetic field).

In some embodiments, the one or more position sensor includes (additionally or alternatively to an electromagnetic sensor) a gyroscope and/or accelerometer and/or ultrasonic sensor (e.g. where a measurement system includes another tracking element includes an ultrasonic transmitter).

Optionally, in some embodiments, tracking element 816 includes a tracking element memory 824 and/or a tracking element processor 822 where, for example, in some embodiments, position sensor/s 820 send collected position data to tracking element memory 824 and/or tracking element processor 822.

Alternatively or additionally, in some embodiments, tracking element 816 communicates (e.g. sends position measurement data and/or receives control signals) through connection 860, with one or more external component, for example, with an external processor and/or controller. In some embodiments, connection 860 includes a wireless communication connection. Alternatively or additionally, in some embodiments, connection 860 includes cable/s and/or wire/s.

In some embodiments, tracking element 816 includes a power supply (not illustrated) which includes one or more of a battery and/or power supply wire and/or cable.

In some embodiments, position sensor/s 820 receives control signals (e.g. from tracking element processor 822 and/or from an external processor and/or controller).

Optionally, in some embodiments, tracking element 816 includes one or more user interface 862. For example, in some embodiments, user interface 862 includes an on/off switch.

In some embodiments, a tracking element includes one or more marker, visible, for example, in non-optical imaging modalities. For example, one or more radiopaque marker and/or visible in MRI and/or ultrasound. In some embodiments, a marker enables registering of imaging measurements to position data and/or optical data collected e.g. as described in FIGS. 1A-B.

Figure 9:
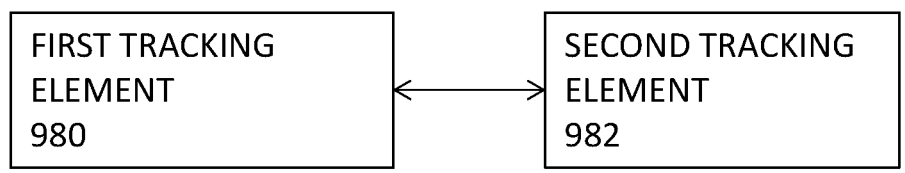
FIG. 9 is a simplified schematic block diagram of a tracking system, according to some embodiments of the invention.

FIG. 9 is a simplified schematic block diagram of a tracking system, according to some embodiments of the invention;

In some embodiments, a tracking system includes a first tracking element 980, and a second tracking element 982 where position measurements are of a position of first tracking elements with respect to a position of the second tracking element.

Figure 10:
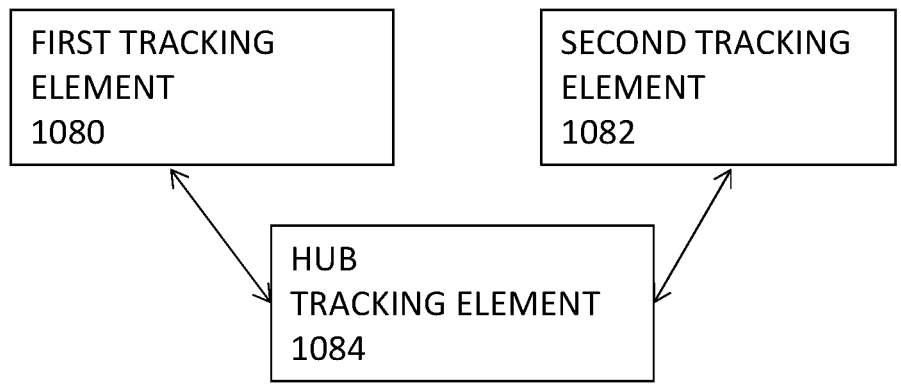
FIG. 10 is a simplified schematic block diagram of a tracking system, according to some embodiments of the invention.

FIG. 10 is a simplified schematic block diagram of a tracking system, according to some embodiments of the invention.

In some embodiments, a tracking system includes a first tracking element 1080 a second tracking element 1082 and hub tracking element 1084. In some embodiments, position measurements of a position of the first tracking element with respect to the hub tracking element and of a position of the second tracking element with respect to the hub tracking element. In some embodiments, hub tracking element 1084 includes an electromagnetic source (e.g. includes an electromagnetic transmitter) and first tracking element 1080 and second tracking element 1082 include electromagnetic sensors.

In some embodiments, a tracking system includes a first tracking element including one or more transmitter configured to broadcast a spatially variable electromagnetic field distribution with time. In some embodiments, at least one additional tracking element is a sensor configured to measure the spatially and temporally variable electromagnetic field, for example, in 6 degrees of freedom (DOF). For example, in some embodiments, at least one additional tracking element includes a three axial coil. Examples of suitable tracking system/s and/or tracking element/s of the present invention are described in "Three-Dimensional Magnetic Tracking of Biaxial Sensors" by E. Paperno et. al. IEEE Transaction on Magnetics, vol. 40, no. 3, may 2004 which is incorporated herein by reference in its entirety.

Exemplary Dental Measurement System

Figure 11:
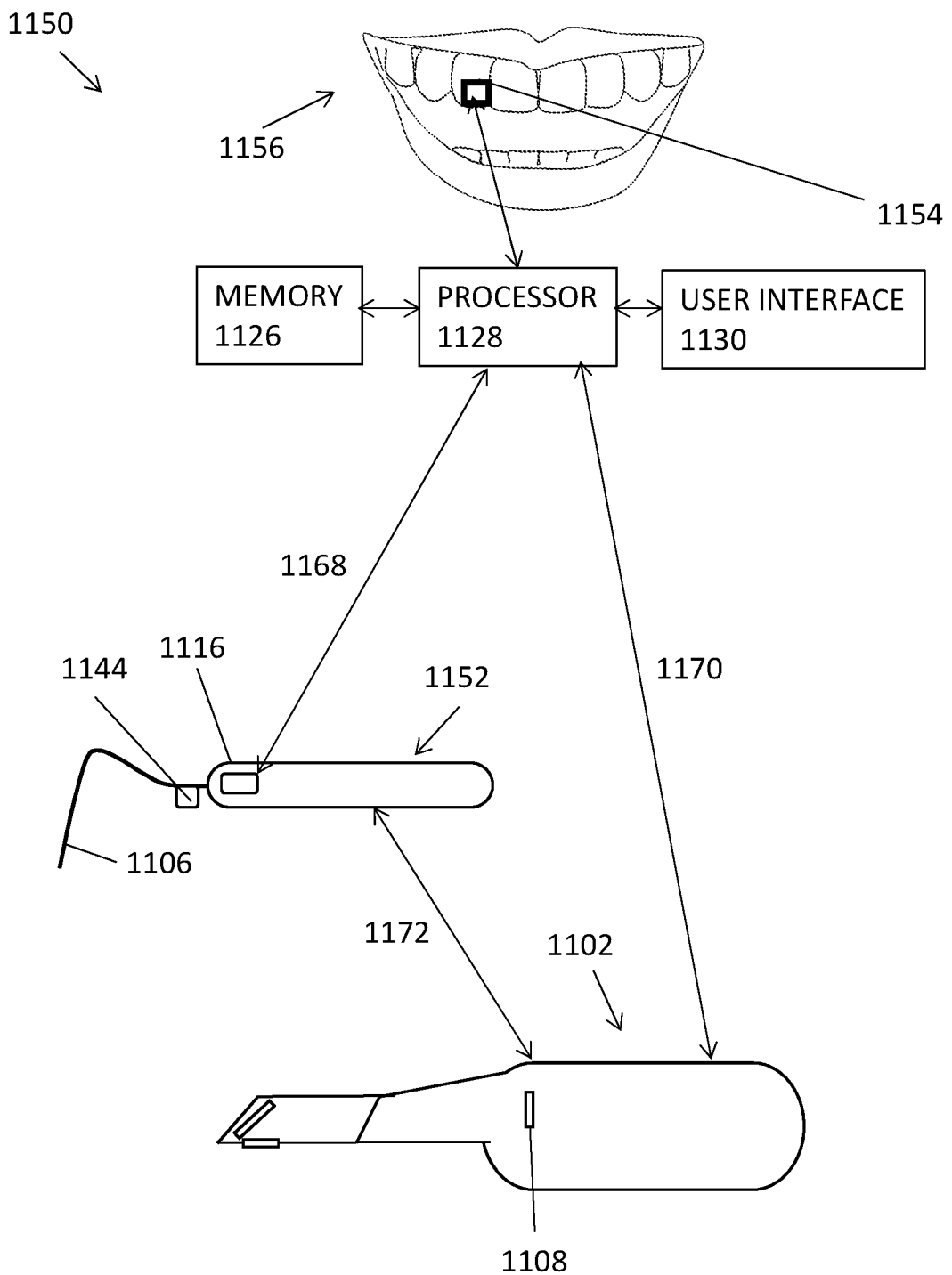
FIG. 11 is a simplified schematic of a dental measurement system, according to some embodiments of the invention.

FIG. 11 is a simplified schematic of a dental measurement system 1150, according to some embodiments of the invention.

In some embodiments, system 1150 includes a tracked measurement device 1152. In some embodiments, tracked measurement device 1152 includes one or more tracking element 1116 (e.g. which includes one or more feature as described and/or illustrated regarding tracking element 816 FIG. 8 and/or which includes one or more feature of tracking elements as described in the section titled "Exemplary tracking element"). For example, in some embodiments, tracking element 1116 includes one or more electromagnet and/or one or more electromagnetic position sensor. For example, in some embodiments, tracking element 1116 includes one or more ultrasonic transmitter and/or ultrasonic transceiver.

Figure 13:
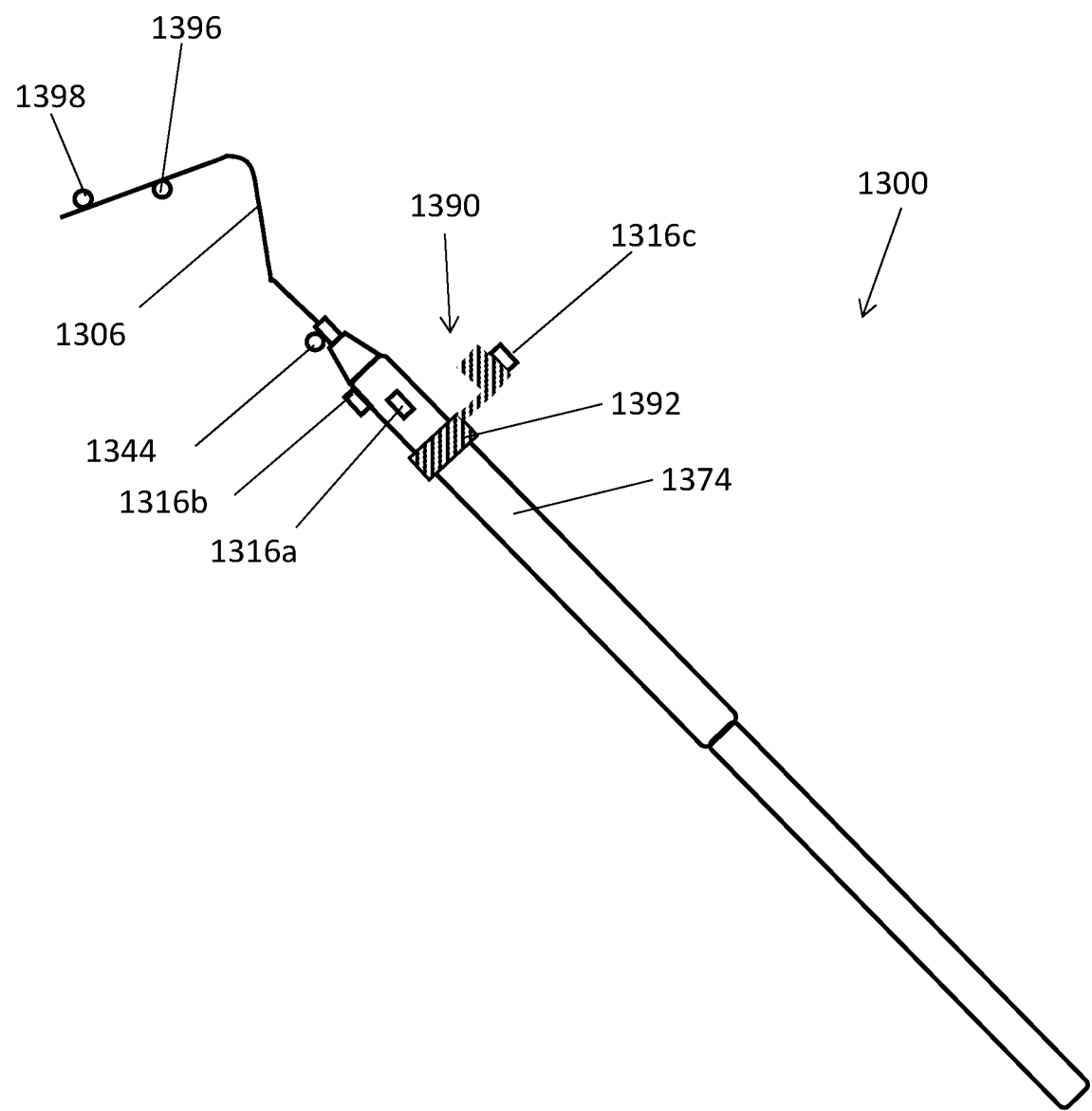
FIG. 13 is a simplified schematic side view of a tracked measurement device, according to some embodiments of the invention.

In some embodiments, tracked measurement device 1152 includes one or more contact sensor 1144 which senses a level of contact between stylus 1106 and an object (e.g. portion of the mouth to be measured), for example contact sensor 1144 including one or more feature as described regarding contact sensor 1344 FIG. 13.

In some embodiments, system 1150 has single tracking element e.g. mounted on the tracked measurement device where the single tracking element provides information as to change of position of the tracking element, e.g. the tracking element includes an accelerometer.

In some embodiments, system 1150 includes a second tracking element where position measurement data is measurement of a distance between the tracking element on the tracked measurement device and the second tracking element 1154. For example, in some embodiments, electromagnetic tracking is used where tracking element 1116 includes an electromagnetic source and the second tracking element includes an electromagnetic position sensor. Alternatively, or additionally, in some embodiments tracking element 1116 includes an electromagnetic sensor and second tracking element 1154 includes an electromagnetic source.

In some embodiments, the second tracking element is configured for attachment to a subject for which dental measurements are to be taken. For example, in some embodiments, a mouth tracking element is 1154 (e.g. including one or more electromagnetic coil and/or including one or more feature of tracking element 816, FIG. 8) is attached to a subject's mouth 1156 (e.g. to a tooth or teeth e.g. as described regarding and/or illustrated by FIGS. 17-24). In some embodiments, position data collected by system 1150 includes a position of tracked measurement device 1152 with respect to mouth tracking element 1154. For example, a position of tracking element 1116 with respect to mouth tracking element 1154. For example, a position of a tip of a stylus 1106 with respect to mouth tracking element 1154.

In some embodiments, tracking element 1116 of tracked measurement device 1152 includes one or more position sensor which measures a position of tracking element 1116 with respect to mouth tracking element 1154, where, for example, in some embodiments, position sensor/s of tracking element 1116 include electromagnetic sensor/s and mouth tracking element 1154 includes one or more electromagnetic source. Alternatively or additionally, in some embodiments, mouth tracking element 1154 includes one or more position sensor which measures a position of tracking element 1116 with respect to mouth tracking element 1154, where, for example, in some embodiments, position sensor/s of mouth tracking element 1154 include electromagnetic sensor/s and tracking element 1116 includes one or more electromagnetic source.

An example of a suitable commercially available tracking system where a first tracking element is attached to a tracked measuring device and a second tracking element is mounted within the mouth is Polehmus™ Micro Sensor 1.8™ which provides active electromagnetic tracking.

In some embodiments, tracking element 1116 and/or mouth tracking element 1154 are connected (e.g. wirelessly and/or by wires and/or cables) to external processor 1128, for example, sending measurement data and/or receiving control signals from processor 1128.

In some embodiments, tracking elements 1116 and 1154 are connected wirelessly and/or with a wire and/or cable.

In some embodiments, additionally or alternatively (alternatively where the system lacks a mouth tracking element) system 1150 includes an IOS tracking element and position measurement data is of a position of the tracked measurement device with respect to the IOS.

In some embodiments, tracked measurement device 1152 includes a portion configured to contact a patient's mouth, for example, a stylus 1106. In some embodiments, stylus 1152 is sized and/or shaped for contacting a subgingival portion of a tooth without causing damage to gingiva.

In some embodiments, a tracked measurement device stylus (and/or an add-on device stylus), for example stylus 1106 and/or 1206 and/or 1306 is about 1 mm-30 mm or 3-20 mm or 5-20 mm long or lower or higher or intermediate lengths or ranges. In some embodiments, the stylus is sized and shaped to be inserted between a tooth and surrounding gingiva, optionally without damaging the gingiva. For example, in some embodiments, a thickness of the stylus is such that the stylus is inserted between a tooth and surrounding gingiva, optionally, without damaging the gingiva. In some embodiments, stylus 1106 has a thickness of about 0.5-1 mm at a tip of the stylus and about 1-5 mm, or 2-4 mm or about 3 mm at the top of the stylus where the stylus is attached to a body of the tracked measurement device.

In some embodiments, a tracked measurement device for example stylus 1106 and/or 1206 and/or 1306 includes one or more marker (not illustrated), e.g. as described in documents incorporated into this document by reference.

In some embodiments, position data is collected by moving tracked measurement device 1152 within a patient's mouth, for example, while contacting stylus 1106 to portions of the mouth. In some embodiments, position data is collected by position sensor/s within tracked measurement device 1152.

In some embodiments, tracking element 1116 is connected by connection 1168 (where, in some embodiments, connection 1168 includes a wireless communication connection and/or includes cable/s and/or wire/s) to an external processor 1128, for example, sending position measurement data and/or receiving control signals from processor 1128. In some embodiments, processor 1128 is connected to a memory 1126 and/or a user interface 1130.

Figure 14:
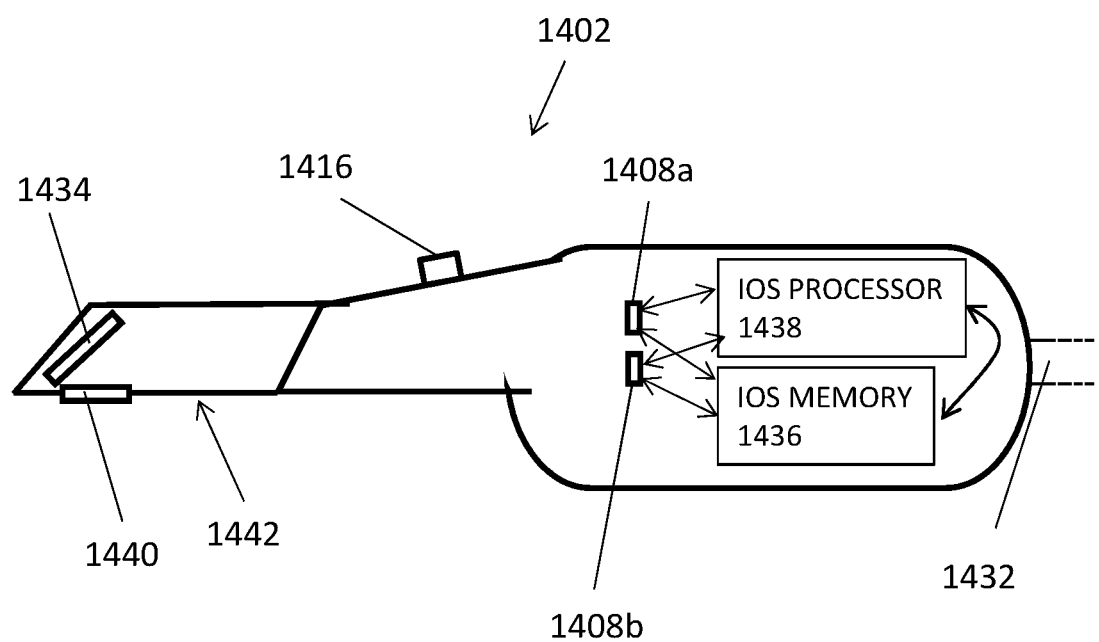
FIG. 14 is a simplified schematic of an exemplary IOS, according to some embodiments of the invention.

In some embodiments, system 1150 includes an IOS 1102 (e.g. which includes one or more feature as described and/or illustrated regarding IOS 1402, FIG. 14). In some embodiments, is an IOS of the art: Exemplary IOS systems include, for example 3Shape TRIOS® IOS, Sirona CEREC® Omnicam IOS, Dental Wings™ IOS. For example, one or more feature as described and/or illustrated regarding IOS 1402 of FIG. 14 as described hereinbelow.

In some embodiments, IOS 1102 includes one or more optical sensor 1108. Optionally, in some embodiments, IOS 1102 includes one or more optical source (not illustrated) configured to illuminate (e.g. with structured light) a portion of the mouth being measured.

In some embodiments, IOS 1102 is connected by connection 1170 (where, in some embodiments, connection 1170 includes a wireless communication connection and/or includes cable/s and/or wire/s) to external processor 1128, for example, sending optical measurement data and/or receiving control signals from processor 1128. In some embodiments, IOS 1102 includes a processor and/or memory and/or user interface, one or more of which communicated through connection with external processor 1128.

In some embodiments, processor 1128 receives position data from tracked measurement device 1152 and/or optical data from IOS 1102. In some embodiments, processor 1128 integrates the position data and optical data (e.g. as described regarding step 108, FIGS. 1A-B).

Optionally, in some embodiments, tracked measurement device 1152 communicates with IOS 1102 through a connection 1172 (where, in some embodiments, connection 1172 includes a wireless communication connection and/or includes cable/s and/or wire/s). Optionally, in some embodiments, a processor within tracked measurement device 1152 and/or a processor within IOS 1102 receives and/or integrates position data and optical data. Where integration is, for example, as and/or regarding step 108, FIGS. 1A-B. In some embodiments, system 1150 lacks one or more of external memory 1126 and/or processor 1128 and/or user interface 1130 and/or connectivity thereto 1168, 1170.

In some embodiments, system 1150 lacks an IOS and/or optical sensor/s and, for example, receives optical measurement data from one or more external data source.

In some embodiments, system 1150 includes one or more user interface 1130 which is configured to display an alert and/or indication to a user (e.g. one or more indication as described in the section titled "Exemplary feedback". Where, for example, in some embodiments, an indication or alert is visual (e.g. illuminated light/s, display on screen) and/or sound. In some embodiments, user interface 1130 is located on a central control device (e.g. including a display and one or more user interface and optionally housing memory 1126 and/or processor 1128). In some embodiments, the tracked measurement device and/or the IOS and/or the mouth tracking element include one or more user interface.

In some embodiments, user interface 1130 includes a display, for example for displaying to a user collected data and/or generated model/s.

Figure 12:
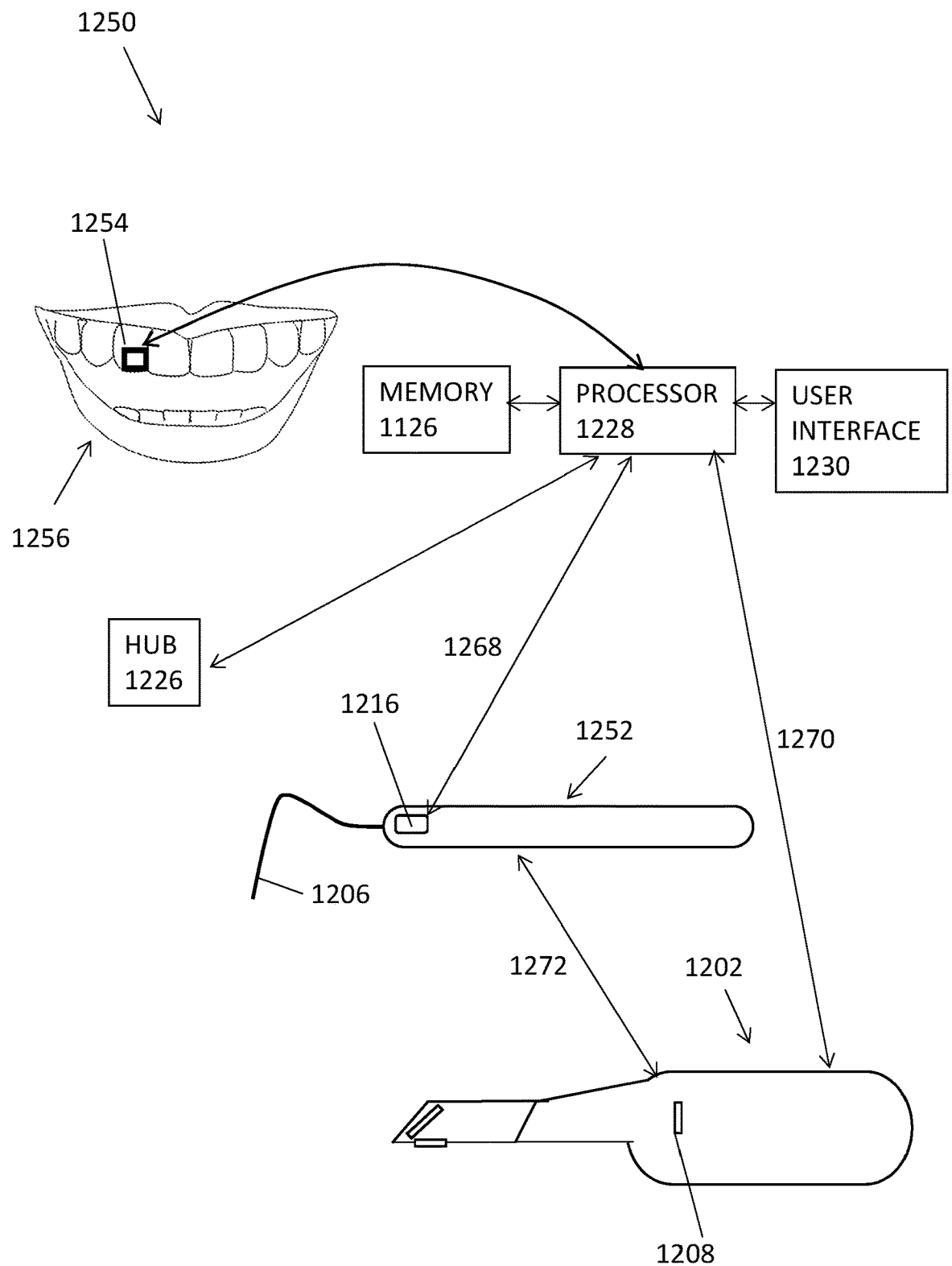
FIG. 12 is a simplified schematic of a dental measurement system, including one or more tracking element configured to be attached to a patient, according to some embodiments of the invention.

FIG. 12 is a simplified schematic of a dental measurement system 1150, including one or more tracking element 1254 configured to be attached to a patient 1256, according to some embodiments of the invention.

In some embodiments, system 1250 includes one or more feature as described regarding system 1150 of FIG. 11: In some embodiments, system 1250 includes a tracked measurement device 1252 optionally connected by connection 1268 to an external processor 1228. In some embodiments, system 1250 includes an IOS 1202 which is optionally connected to tracked measurement device 1252 and/or processor 1228 by connections 1272 and 1270 respectively. In some embodiments, tracked measurement device 1252 includes a stylus 1206. In some embodiments, tracked measurement device 1252 includes one or more tracking element 1216. In some embodiments, IOS includes one or more optical sensor 1208. In some embodiments, processor is connected to one or more of a memory 1226 and a user interface 1230.

Optionally, in some embodiments, system 1250 includes a position measurement hub 1226. In some embodiments, hub 1226 is connected to processor 1228 by a connection sending position measurement data and/or receiving control signals from processor 1128.

In some embodiments, hub 1226 includes one or more tracking element (not illustrated). In some embodiments, position data collected by system 1250 includes a position of one or more of tracking element 1216 and mouth tracking element 1254 with respect to hub 1226.

For example, in some embodiments, hub 1226 measures a position of tracking element 1216 with respect to hub 1226 and measures a position of mouth tracking element 1254 with respect to hub (e.g. using one or more position sensor located within the hub). In some embodiments, the position of mouth tracking element with respect to the hub is used to correct a measured position of tracking element 1216 with respect to the hub, for example, correcting for patient movement during measurement.

In some embodiments, a system includes a hub, and does not include a mouth tracking element, where position measurements are of the tracked measurement device with respect to the hub. In some embodiments, a system includes a hub, a first tracking element on the tracked measurement device and a second tracking element on the IOS where position measurements include position of the tracked measurement device and the IOS with each with respect to the hub.

Optionally, in some embodiments, IOS 1202 includes one or more tracking element (not illustrated in FIG. 12). In some embodiments, position data collected by system 1250 includes position of an IOS tracking element with respect to one or more of hub 1226, tracking element 1216 and mouth tracking element 1254.

Exemplary Tracked Measurement Device

FIG. 13 is a simplified schematic side view of a tracked measurement device 1352, according to some embodiments of the invention.

In some embodiments, tracked measurement device 1352 includes a stylus 1306 (e.g. including one or more feature as described and/or illustrated regarding stylus 1106 and/or stylus 1206 FIG. 11 and FIG. 5 respectively).

In some embodiments, tracked measurement device 1352 includes one or more tracking element 1316*a*, 1316*b*, 1316*c* (e.g. where one or more of tracking elements 1316*a*, 1316*b*, 1316*c* include one or more feature as described and/or illustrated regarding tracking element 816 FIG. 8 and/or tracking element 1116 FIG. 11 and/or tracking element 1216 FIG. 12). In some embodiments, a tracking element 1316*a* is incorporated into a body 1374 of tracked measurement device 1352. Alternatively or additionally, in some embodiments, a tracking element 1316*b* is mounted on an outer surface of the body 1374 of tracked measurement device 1352.

In some embodiments, tracked measurement device 1352 includes one or more contact sensor 1344 which senses a level of contact between stylus 1306 and an object (e.g. portion of the mouth to be measured). In some embodiments, contact sensor 1344 is a force sensor, and, for example, is configured to measure bending of stylus 1306. In some embodiments, contact sensor/s include one or more strain gauges mounted on the stylus (not illustrated). In some embodiments, contact sensor/s measure contact based on electrical properties of the tip, for example, in some embodiments, one or more contact sensor is a capacitance sensor which measures electrical properties of the stylus (e.g. at tip of the stylus).

In some embodiments, tracked measurement device 1352 includes one or more gyroscope and/or accelerometer (not illustrated). Where, for example, a gyroscope provides data (e.g. optionally stored with and/or registered with other position data e.g. electromagnetic sensor position data) regarding rotation and/or angle of the tracked measurement device. Where, for example, an accelerometer provides additional position data (e.g. optionally stored with and/or registered with other position data e.g. electromagnetic sensor position data) for the tracked measurement device. In some embodiments, gyroscope and/or accelerometer data is used to improve electromagnetic position data.

In some embodiments, tracked measurement device 1352 includes one or more marker configured to be visible in non-optical imaging (e.g. one or more radiopaque marker and/or one or more MRI marker and/or visible in ultrasound imaging) potentially enabling registration of a position of the tracked measurement to image data (e.g. by CT and/or x-ray and/or MRI and/or ultrasound imaging) collected e.g. during collection of measurements with the device.

In some embodiments, an attachment 1390 is attached to tracked measurement device 1352. In some embodiments, attachment 1390 is a separate part which is, for example, attached by sliding a connector 1392 onto 1374. In some embodiments, attachment includes one or more tracking element 1316*c*.

In some embodiments, a portion of a tracked measurement device configured to be contacted to mouth portions to collect position measurement includes one or more marker 1396, 1398 where stylus marker/s are, in some embodiments, as described in documents incorporated into this document by reference (listing of documents incorporated by reference above).

In some embodiments, tracked measurement device 1352 is a standard dental probe to which one or more tracking element 1316*b* is attached. Where a standard dental probe includes, for example, a body 1374 sized and/or shaped to be grasped by a human hand and a stylus 1306 extending from the body where the stylus is sized and/or shaped to be inserted between a tooth and gingiva without damaging the gingiva.

Exemplary IOS

FIG. 14 is a simplified schematic of an exemplary IOS 1402, according to some embodiments of the invention. In some embodiments, IOS 1420 includes one or more optical sensor 1408*a* (e.g. which in some embodiments includes a camera and/or array of detector pixels). Optionally, in some embodiments, IOS 1402 includes one or more light projector 1408*b* configured to illuminate (e.g. with structured light) a portion of the mouth being measured.

In some embodiments, optical sensor/s 1408*a* receive an optical signal which arrives through a window 1440 and/or is directed towards the sensors by a mirror 1434. In some embodiments, light projector 1408*b* transmits an optical signal which passes through window 1440 and/or is directed out of the IOS by mirror 1434.

In some embodiments, IOS includes a cover 1442 which is, for example, detachable from a body of IOS and/or is disposable and/or or serializable (e.g. by autoclave). In some embodiments, cover 1442 includes window 1440 and/or mirror 1434. In some embodiments, IOS includes an internal IOS processor 1438. In some embodiments, IOS includes an internal IOS memory 1436. In some embodiments, optical measurement data is transferred from optical sensor/s 1408 to IOS processor 1438 and/or IOS memory 1436. In some embodiments, IOS includes a connection 1432 through which, in some embodiments, IOS receives electrical power and/or communications between IOS and one or more external element, e.g. an external processor, e.g. an external user input. In some embodiments, IOS includes one or more user input (e.g. for a user to input control instructions as to collection of optical data, e.g. an on/off switch).

Optionally, in some embodiments, IOS includes one or more tracking element 1416 (e.g. tracking element 1416 includes one or more feature of tracking element 816, FIG. 8). In some embodiments, tracking element 1416 is affixed to IOS e.g. a tracking element is attached to an IOS of the art. In some embodiments, the IOS processor and/or memory are connected to tracking device 1416 e.g. wirelessly and/or by a wire. For example, in some embodiments, IOS processor 1438 receives position data from tracking element 1416.

Exemplary Add-on Device

In some embodiments, both optical data and position data are collected by moving a single tracked measurement device within a patient's mouth. In some embodiments, optical data and position data are collected concurrently.

Figure 15A:
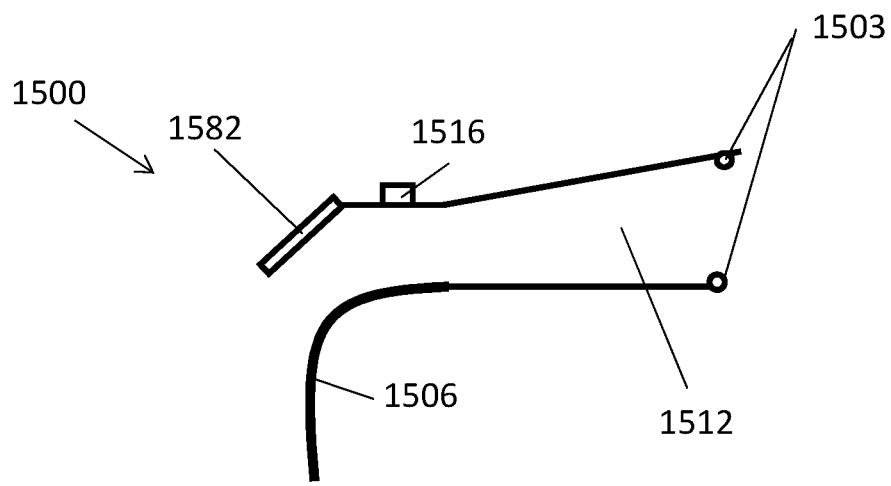
FIG. 15A is a simplified schematic cross sectional view of an add-on including a tracking element, according to some embodiments of the invention.

FIG. 15A is a simplified schematic cross sectional view of an add-on 1500 including a tracking element 1516, according to some embodiments of the invention.

Figure 15B:
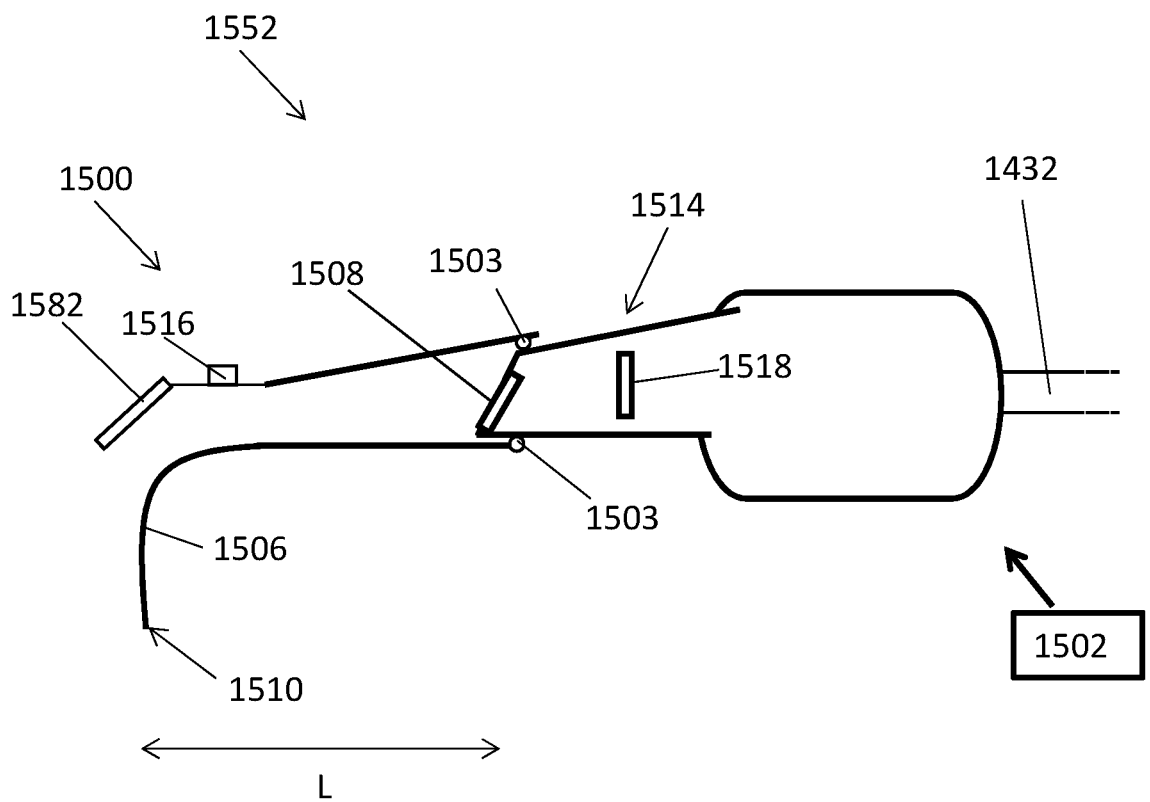
FIG. 15B is a simplified schematic of a tracked measurement device which collects both optical and position dental measurement data, according to some embodiments of the invention.

FIG. 15B is a simplified schematic of a tracked measurement device 1552 which collects both optical and position dental measurement data, according to some embodiments of the invention.

In some embodiments, tracked measurement device 1552 includes an add-on 1500 configured to be attached to an IOS 1502. In some embodiments, IOS includes one or more feature as described and/or illustrated regarding IOS 1402 FIG. 14 and/or IOS 1202 FIG. 12 and/or IOS 1102 FIG. 4 and/or as described regarding step 100, FIGS. 1A-B.

In some embodiments, add-on 1500 includes one or more tracking element 1516 (e.g. in some embodiments, tracking element 1516 includes one or more feature of tracking element 816, FIG. 8).

Optionally, in some embodiments, add-on tracked measurement device 1500 includes a portion configured to contact a patient's mouth, for example, a stylus 1506 (in some embodiments, stylus 1506 includes one or more feature of described and/or illustrated regarding stylus 1106 FIG. 11 and/or stylus 1206 FIG. 12 and/or stylus 1306 FIG. 13). In some embodiments, add-on tracked measurement device 1500 does not includes a stylus and/or portion configured to contact a patient's mouth. For example, in some embodiments, an add-on configured to be attached to an IOS includes a tracking element.

In some embodiments, add-on 1500 includes one or more mirror 1582 which, in some embodiments, is positioned on the tracked measurement device to transfer an image of an area including a tip 1510 of stylus 1506 to an optical element 1508 of IOS 1502 (and/or to transfer light from optical element 1508 onto an area including tip 1510). Where, for example, in some embodiments, optical element 1508 includes one or more optical sensor and/or one or more light source (e.g. a structured light source). In some embodiments, optical element 1508 is a protective window for optical components 1518.

In some embodiments, add-on 1500 is configured for attachment to an IOS distal portion 1514. In some embodiments, attachment of add-on 1500 is sufficiently strong that the add-on remains fixed on the IOS during a scan, including a scan where add on stylus 1506 is moved between a tooth and gingiva. In some embodiments, attachment between the add-on and the IOS is rigid (e.g. movement between the two parts (e.g. during a scan) being less than about 1 mm, or less than about 0.5 mm, or less than about 0.2 mm or less than about 0.1 mm, or less than about 0.05 mm, or less than about 0.02 mm or less than about 0.01 mm, or higher or lower or intermediate values). In some embodiments, the add-on is configured (e.g. sized and/or shaped) to be rigidly attached to an IOS distal portion 1514. For example, where a lumen 1512 of tracked measurement device 1500 is sized and/or shaped to be placed over distal portion 1514. For example, in some embodiment's, a cross sectional area of at least a portion of lumen 1512 which is configured to house an IOS is 0.1-10 cm$^2$, or 0.5-3 cm$^2$ or lower or higher or intermediate areas or ranges.

In some embodiments, IOS 1502 is configured for use with a cover (e.g. single use cover) where the cover is attached to distal portion 1514 of IOS 1502. For example, as described with reference to IOS 1402, FIG. 14. In some embodiments, add-on 1500 is used instead of a cover. In some embodiments, strength of attachment between add-on 1500 and IOS 1502 is sufficient to prevent movement of that mirror 1582 and optical element 1508 out of alignment under, e.g. movement under gravity and/or mechanical forces acting on stylus 1516 as it is moved within the mouth.

In some embodiments, lumen 1512 is sized to an IOS distal portion 1514 and, once add-on 1500 is positioned on IOS, friction is sufficient to hold the add-on onto the IOS.

In some embodiments, add-on includes one or more connector 1503 to connect the add-on to the IOS. For example, in some embodiments, connector 1503 includes adhesive. For example, in some embodiments, connector 1503 includes a snap-fit and/or interference fit connection and/or screw fit connection, and/or ring socket connection. In some embodiments, IOS includes a release button, e.g. and interference fit release button, (not illustrated) For example, in some embodiments, connector 1503 includes compressible and/or high friction material (e.g. includes a rubber O-ring).

In some embodiments, add-on 1500 is configured to be used with and/or reconfigure and/or refurbish an existing (e.g. manufacture finished and/or used) IOS.

In some embodiments, an add-on 1500 is added to an IOS during manufacture of the IOS.

In some embodiments, the add-on is sized and/or shaped to be inserted into a human mouth. In some embodiments, the add-on is sized and/or shaped to be inserted into a human mouth along with a distal portion of an IOS to which the add-on is attached. In some embodiments, a length, L, of add-on 1500 extending distally of an IOS to which it is attached (and/or a total length of the add-on) is about 0.5-15 cm, or 0.5-5 cm or 1-5 cm or lower or higher or intermediate lengths or ranges.

Exemplary Tracking Element Attachment to a Subject

Figure 16:
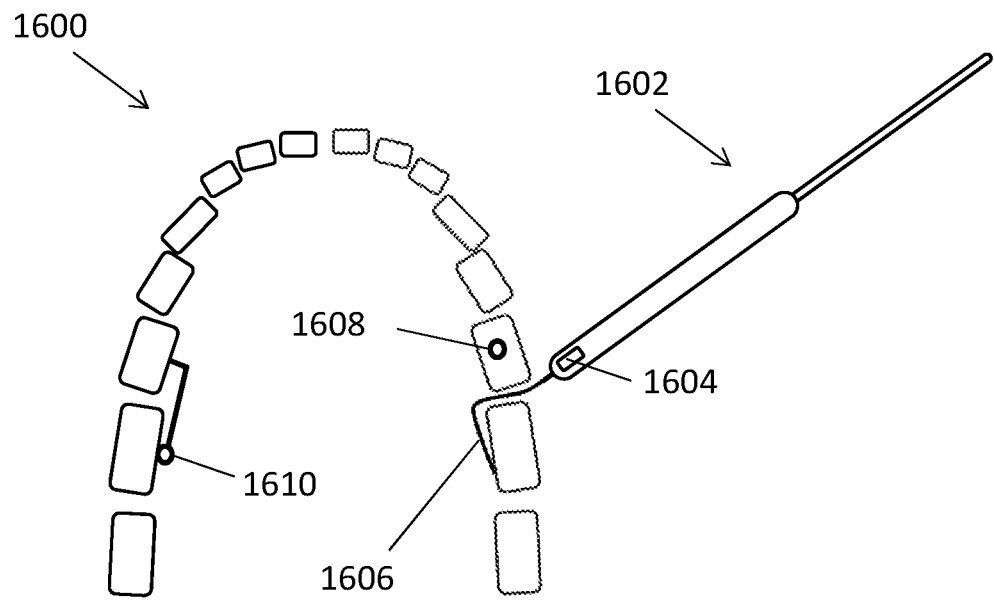
FIG. 16 is a simplified schematic top view of teeth in a jaw during measurement by a tracked measurement device, according to some embodiments of the invention.

FIG. 16 is a simplified schematic top view of teeth 1600 in a jaw during measurement by a tracked measurement device 1602, according to some embodiments of the invention.

In some embodiments, tracked measurement device 1602 includes a tracking element 1604 (e.g. including one or more feature as described and/or illustrated with reference to tracking element 816 FIG. 8). In some embodiments, tracked measurement device 1602 includes a stylus 1606 (in some embodiments, stylus 1506 includes one or more feature of described and/or illustrated regarding stylus 1106 FIG. 11 and/or stylus 1206 FIG. 12 and/or stylus 1306 FIG. 13).

In some embodiments, one or more tracking element 1608, 1610 is affixed to the mouth, e.g. before measurement of the mouth (e.g. before optical data and/or position data is collected and/or as described with reference to FIGS. 1A-B). In some embodiments, tracking element 1608, 1610 is affixed sufficiently rigidly that it remains in position during scanning moving by at most 0.5 mm, or 0.1 mm, or 0.05 mm, or 0.01 mm or lower or higher or intermediate distances. In some embodiments, a maximum dimension of a tracking element affixed to the mouth is about 0.1-10 mm, or 0.1-2 mm, or 0.1-1 mm, or about 1.8 mm, or about 1 mm, or lower or higher or intermediate dimensions or ranges.

In some embodiments, a tracking element is attached to a tooth (or to more than one tooth). In some embodiments, a tracking element 1610 is attached to two teeth. In some embodiments, a tracking element 1610 is attached to a jaw such that it is positioned on a side of the tooth (e.g. inner side as illustrated by tracking element 1610 or an outer side of a tooth). In some embodiments, a tracking element is attached to a top surface of a tooth 1608 and/or is attached to the tooth such that it is positioned above a top surface of the tooth.

In some embodiments, a tracking element 1610 is affixed to a jaw on an opposite side to where position measurements (e.g. including subgingival measurements) of the jaw are collected. Alternatively or additionally, in some embodiments, a tracking element 1610 is affixed to a same side of a jaw to where position measurements (e.g. including subgingival measurements) are collected.

In some embodiments, a location within a patient's mouth for a tracking element is selected, for example, based on the purpose of the measurements. For example, locating the tracking element further away from the portion of the mouth to be measured (e.g. on the other jaw) potentially prevents the tracking element from obscuring optical data collection and/or physically obstructing movement of the tracked measurement device. In some embodiments, a tracking element is positioned near to the portion of the mouth to be measured a potential advantage being increasing measurement accuracy.

In some embodiments, a tracking element is directly attached to a portion of a subject's mouth. Alternatively, or additionally, in some embodiments, a tracking element adaptor is attached to the mouth (e.g. to a tooth or teeth) and the tracking element adaptor includes and/or is configured to host a tracking element. In some embodiments, a tracking element is recessed, at least partially, within an adaptor (e.g. tracking element 2102 is recessed into a body of adaptor 2100, FIG. 21). In some embodiments, an indentation and/or lumen within an adaptor is sized and/or shaped to house at least a portion of a tracking element. In some embodiments, an adaptor includes an indentation and/or lumen of volume 0.01-2 cm$^3$, or 0.1-1 cm$^3$ or lower or higher or intermediate volumes or ranges.

Figure 22:
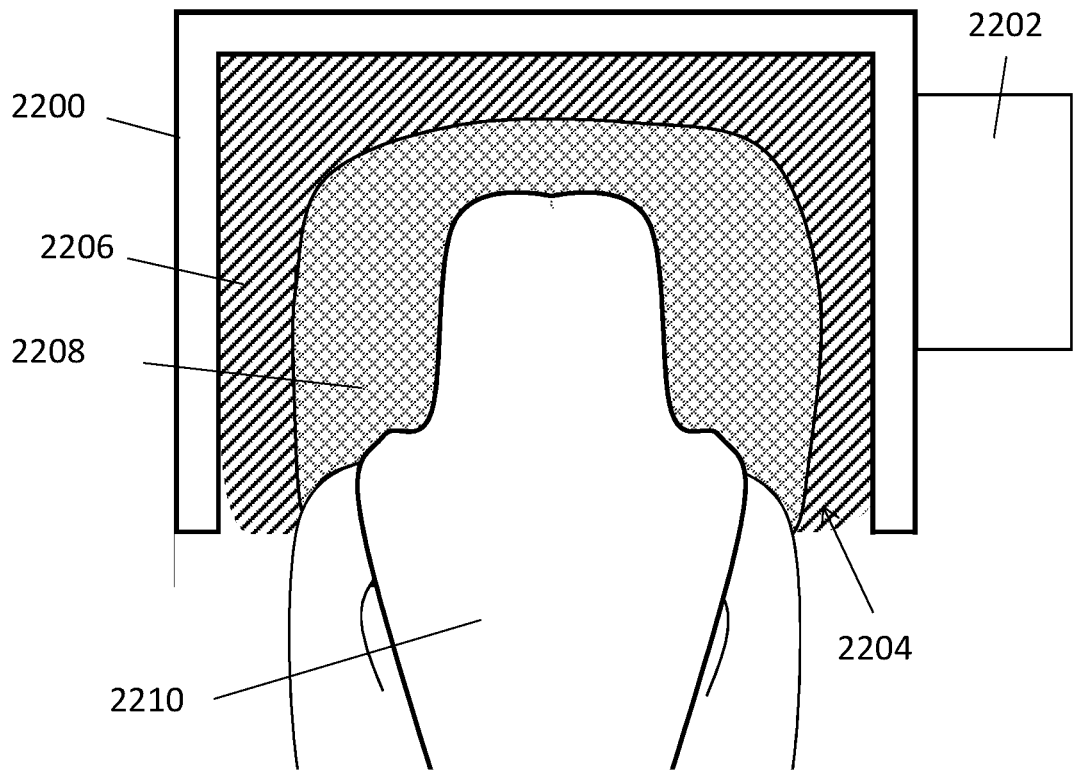
FIG. 22 is a simplified schematic of a tracking element adaptor including a tracking element and a lumen for coupling material, according to some embodiments of the invention.

In some embodiments, a tracking element is not recessed within an adaptor, for example, tracking element 2202, FIG. 22. Regarding the figures of adaptors described hereinbelow, it is to be understood that, although recessing or the lack thereof is illustrated, each embodiment may have a tracking element recessed within the adaptor and/or extending away from the adaptor. Furthermore, although a single tracking element is illustrated for each adaptor, in some embodiments, a single adaptor hosts more than one tracking element. In some embodiments, an adaptor is attached to more than one tooth. In some embodiments, an adaptor is attached to a prepared tooth.

Figure 17:
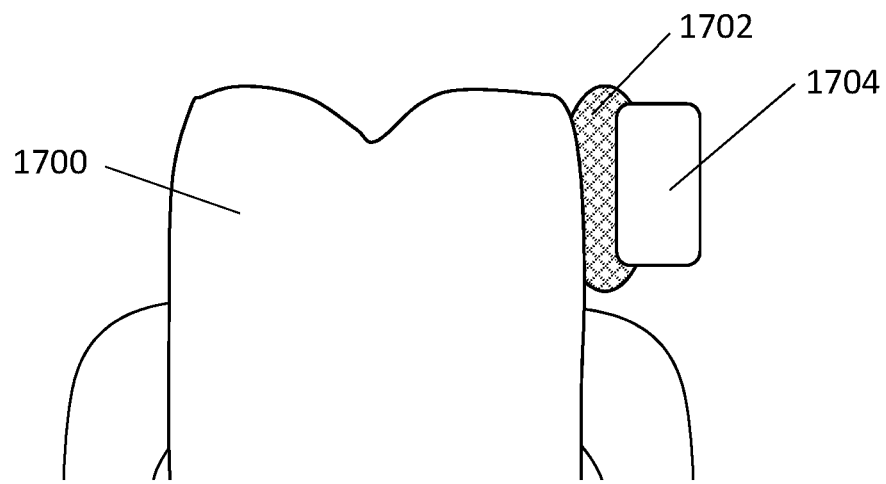
FIG. 17 is a simplified schematic of a tracking element attached to a tooth by adhesive, according to some embodiments of the invention.

In some embodiments, a tracking element is affixed to a tooth using adhesive. FIG. 17 is a simplified schematic of a tracking element 1704 attached to a tooth 1700 by adhesive 1702, according to some embodiments of the invention. In some embodiments, tracking element 1704 is attached to a supragingival portion of tooth 1700.

Figure 18:
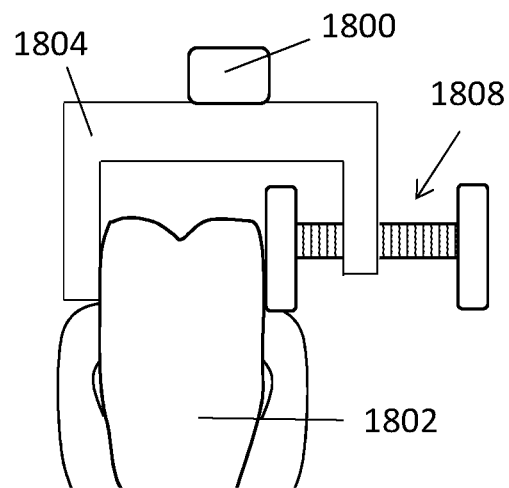
FIG. 18 is a simplified schematic of a tracking element attached to a tooth by a clamp, according to some embodiments of the invention.

In some embodiments, a tracking element clamped onto one or more tooth. FIG. 18 is a simplified schematic of a tracking element 1800 attached to a tooth 1802 by a clamp 1804, according to some embodiments of the invention. In some embodiments, tracking element 1800 is attached to a body 1806 of clamp 1804. In some embodiments, clamp 1804 includes a screw mechanism 1808 for sizing clamp 1804 to tooth 1802. In some embodiments, a cushioning material (not illustrated) is located between clamp 1804 and tooth 1802, a potential advantage of which is preventing the clamp from damaging the tooth. In some embodiments, cushioning material includes one or more of silicone rubber, silicone wax, silicone gel and/or other flexible material. In some embodiments, cushioning material provides a continuous buffer between the tooth and the clamp. In some embodiments, cushioning material is at one or more discrete point between the tooth and clamp.

Figure 19:
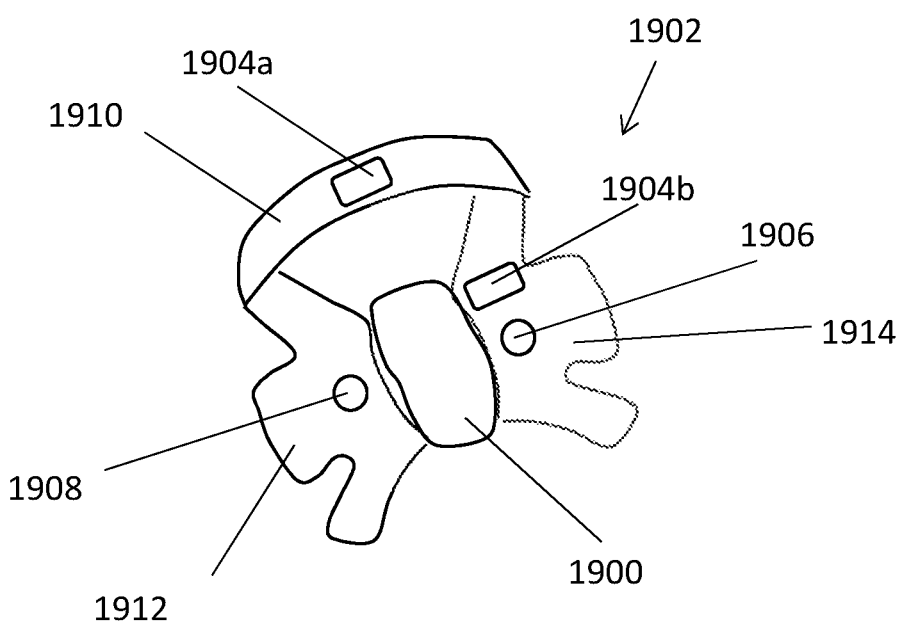
FIG. 19 is a simplified schematic of a dental clamp including a tracking element, according to some embodiments of the invention.

FIG. 19 is a simplified schematic of a dental clamp 1902 including a tracking element 1904, according to some embodiments of the invention. In some embodiments, clamp 1902 includes one or more of a bow 1910, one or more hole 1906, 1908, one or more anchor blade 1912, 1914, for example, as is known in the art of rubber dam clamps.

In some embodiments, for example, as is known in the art of rubber dam clamps, dental clamp 1902 is affixed and/or removed from a tooth using a forceps (not illustrated) which, in some embodiments, connects to clamp 1902 at holes 1906, 1908. In some embodiments, clamp 1902 is stretched elastically by the forceps to place the clamp onto a tooth 1900, the elastic force holding the clamp onto the tooth.

In some embodiments a rubber dam clamp includes one or more tracking element 1904*a*, 1904*b*, for example affixed to and/or recessed and/or incorporated into a portion of rubber dam clamp 1902. For example, onto bow 1910 and/or anchor blade 1914. In some embodiments, rubber dam clamps including tracking elements are configured (e.g. sized and/or shaped) for attachment to different teeth e.g. as is known in the art of rubber dam clamps.

Figure 20A:
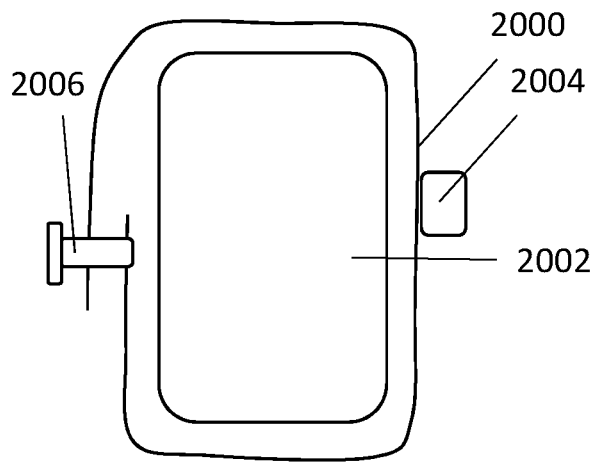
FIG. 20A is a simplified schematic top view of a tracked measurement device adaptor, arranged around a tooth, according to some embodiments of the invention.
Figure 20B:
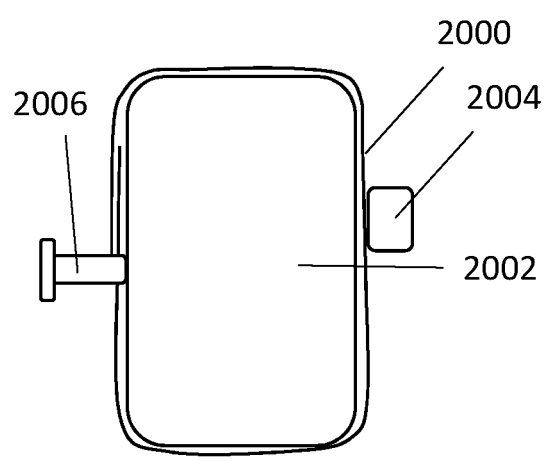
FIG. 20B is a simplified schematic top view of the tracked measurement device adaptor of FIG. 20A, tightened onto a tooth, according to some embodiments of the invention.

In some embodiments, the element is attached to a tooth by a tracking element adaptor where a lumen of the adaptor is arranged around the tooth and reduced in size until the adaptor is attached onto the tooth. FIG. 20A is a simplified schematic top view of a tracked measurement device adaptor 2000, arranged around a tooth 2002, according to some embodiments of the invention. FIG. 20B is a simplified schematic top view of the tracked measurement device adaptor 2000 of FIG. 20A, tightened onto a tooth 2002, according to some embodiments of the invention. In some embodiments, adaptor 2002 includes a tracking element 2004. In some embodiments, adaptor 2002 includes a loop of material which is arranged around tooth 2002 (e.g. as illustrated in FIG. 20A) and then the loop of material is tightened onto the tooth (e.g. reducing a length of the loop extending around the tooth), attaching the loop to the tooth (e.g. as illustrated in FIG. 20B). In some embodiments, the adaptor is tightened onto the tooth by a screw mechanism 2006.

Figure 21:
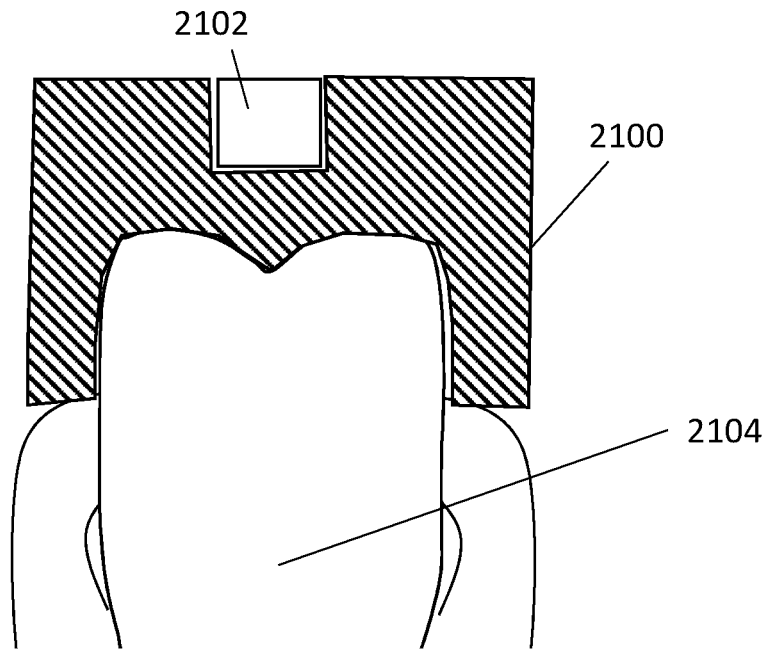
FIG. 21 is a simplified schematic cross sectional view of a tracking element adaptor including a tracking element, coupled to a tooth, according to some embodiments of the invention.

FIG. 21 is a simplified schematic cross sectional view of a tracking element adaptor 2100 including a tracking element 2102, coupled to a tooth 2104, according to some embodiments of the invention. In some embodiments, a tracking element adaptor is sized and/or shaped to closely fit (e.g. with less than 1 mm or less than 0.5 mm or 0.01-0.5 mm separation between the tooth and the adaptor for at least 50% or 80% or at least 40-99% of a surface of the adaptor opposing a surface of the tooth) onto a tooth. In some embodiments, a body of the adaptor is constructed (e.g. using 3D printing and/or milling) using measurements of the tooth. In some embodiments, the measurements for construction of the adaptor include optical measurement data collected with an IOS. In some embodiments, tracking element 2102 is recessed within adaptor 2100.

In some embodiments, collecting a tooth impression is combined with attaching a tracking element. FIG. 22 is a simplified schematic of a tracking element adaptor 2200 including a tracking element 2202 and a lumen 2204 for coupling material, 2206, 2208, according to some embodiments of the invention. Where, in some embodiments, coupling material is suitable for adhering the adaptor to the tooth. In some embodiments, material 2206, 2208 includes, for example, impression material and/or plastic material and/or polymer material.

In some embodiments, for example, as is known in the art of collecting dental impressions, low viscosity impression material 2208 is disposed adjacent to a tooth 2210 and strong base putty 2206 is disposed between the low viscosity impression and adaptor 2200. In some embodiments, an impression is taken of a prepared tooth 2210 (e.g. prepared for a crown and/or bridge).

Figure 23:
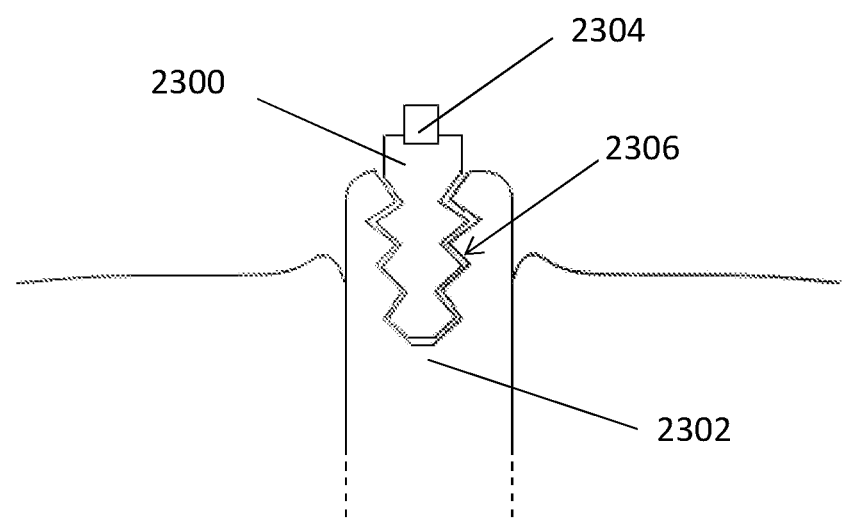
FIG. 23 is a simplified schematic of a tracking element adaptor including a tracked measurement device attached to a dental implant abutment, according to some embodiments of the invention.

In some embodiments, a tracking element adaptor is attached to a dental implant. FIG. 23 is a simplified schematic of a tracking element adaptor 2300 including a tracked measurement device 2304 attached to a dental implant abutment and/or post 2302, according to some embodiments of the invention. In some embodiments, adaptor 2300 is connected to abutment 2302 using attachment methods known in the art of prosthesis to abutment attachment. For example, in some embodiments, adaptor is screwed into abutment (e.g. adaptor and/or abutment include threading 2306).

Figure 24:
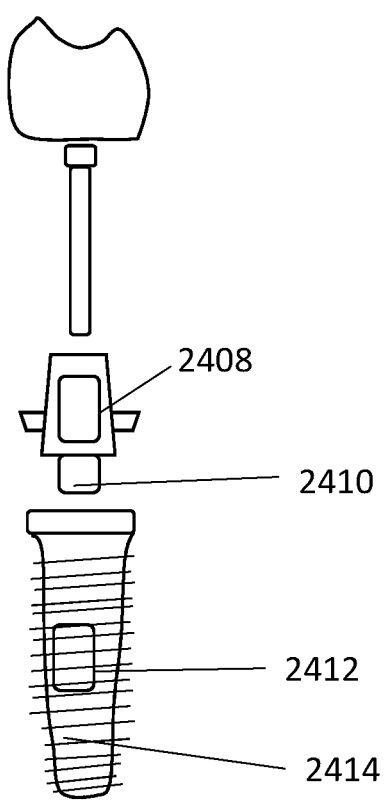
FIG. 24 is a simplified schematic exploded view of a dental implant including at least one tracking element according to some embodiments of the invention.

FIG. 24 is a simplified schematic exploded view of a dental implant including at least one tracking element 2408, 2412, according to some embodiments of the invention. In some embodiments, a post 2410 of a dental implant includes one or more tracking element 2408.

Alternatively or additionally, in some embodiments, an abutment 2414 of a dental implant includes a tracking element 2412. In some embodiments, a tracking element is permanently left within a patient's mouth (e.g. within a dental implant).

In some embodiments, a temporary prosthetic, for example, a temporary crown, includes one or more tracking element (e.g. including one or more feature as described and/or illustrated with reference to tracking element 816 FIG. 8).

In some embodiments, a tracking element is attached to a tooth using an elastic attachment, for example, a mounter which is stretched when placed on and/or around the tooth, elastic tension holding the mounter onto the tooth.

Additional Exemplary Embodiments

Exemplary System Including a Mouth Tracking Element

In an exemplary embodiment, a tracking element is attached to an oral object (e.g. a tooth) on the same jaw as tooth or teeth to be measured. An IOS lacking a tracking element is then used to collect optical data of the tooth or teeth to be measured. A 3D model of optical data collected by the IOS is then generated.

In some embodiments, position measurements are then collected by contacting a stylus of a tracked measurement device to surfaces of a tooth or teeth to be measured. In some embodiments, regions measured include subgingival regions of tooth or teeth to be measured, and one or more region adjacent to subgingival regions in a coronal direction. In some embodiments, a tooth being measured is a prepared tooth and regions measured include a preparation finish line which, in some embodiments, is not visible e.g. covered by gums and/or blood (and/or other fluid and/or debris).

In some embodiments, the regions adjacent to subgingival regions overlap with visible regions measured by the IOS and these overlapping regions are used to align the optical and position data (e.g. to align a 3D optical model and a 3D position measurement model).

In some embodiments, the measurements are then used to construct a prosthetic, for example, a crown where the measurements are used to define an inner geometry of the crown.

Exemplary Dental Measurements: A Mouth Tracking Element, Tracked Measurement Device Including a Stylus and a Tracked IOS In some embodiments, a mouth tracking element is attached to a tooth or other oral object on the same jaw as a tooth (or teeth) to be measured.

In some embodiments, the teeth to be measured are optically measured using an IOS which includes a tracking element which collects position data of a position of the IOS with respect to the mouth tracking element. A 3D model of optical data where the 3D model has a known spatial relationship with respect to the mouth tracking element (for example, due to the position data collected using the position data of the position of the IOS tracking element with respect to the mouth tracking element).

A tracked measurement device is then used to collect position data regarding subgingival regions of the tooth (or teeth) to be measured, including non-visible regions covered by gums and/or fluid (e.g. blood) and/or debris e.g. without requiring cord packing. In some embodiments, the tracked measurement device measures a geometry of a finish line of one or more prepared tooth. In some embodiments, the tracked measurement device does not collect (or is not required to collect) measurements of areas of the tooth or teeth measured using the IOS (e.g. the data sets do not have or are not required to have overlapping regions).

The optical data and position data are then combined as the data sets are in the same coordinate space, the coordinate space e.g. defined by the mouth tracking element.

Exemplary System Tracking Element Only on IOS and Tracked Measurement Device

In some embodiments, an IOS includes a tracking element, and, optionally, the system does not include a mouth tracking element. In some embodiments, optical data of visible portion/s of the mouth is collected by the IOS and then, in some embodiments, a 3D model of optically measured mouth portions is then generated.

Then, in some embodiments, subgingival portions of the mouth (e.g. subgingival tooth portion/s) adjacent to supragingival portions already measured optically are measured using a tracked measurement device including a stylus. During position measurements the IOS collects image/s of the supragingival portions of the mouth portion being measured. In some embodiments, the image/s of the supragingival portions enable the position measurements to be registered to the optical measurements, as position of the tracked measurement device is known with respect to the IOS (due to the tracking element in the IOS and the tracking measurement in the tracked measurement device) and position of both the tracked measurement device and the IOS is known with respect to the previously collected 3D optical measurement model.

Exemplary System Including a Tracked IOS and a Mouth Tracking Element

In some embodiments, a mouth tracking element is affixed within a mouth. An IOS including a tracking element is used to collect (e.g. simultaneously) optical and position data of the mouth. Where position data is, for example, regarding a position of the IOS tracking element with respect to the mouth tracking element. In some embodiments, position data is used to correct optical data.

In some embodiments, measurements of the mouth, are for large mouth portions, where, for example optical measurements accumulate error, e.g. more than two teeth, more than 3 teeth, quarter jaw, half jaw, entire jaw).

Exemplary Tracking to Reduce Accumulated Errors and Subgingival Measurement by Tracking In some embodiments, tracking, for example, of an IOS and/or of a tracked measurement device is used to correct accumulated error in optical only measurements as well as for collecting subgingival measurements using a tracked measurement device including a stylus. Where, for example, the tracked measurement device collects subgingival position measurements (e.g. of a prepared tooth finish line) by contacting the stylus to subgingival areas which, in some embodiments, are covered by gums and/or fluid (e.g. blood).

Exemplary Tracking of a Dental Tool

Referring back to FIG. 11, in some embodiments, tracked measurement device 1152 includes a dental tool, for example, a drill, an ultrasonic scaler. Where, in some embodiments, the drill and/or tool includes one or more feature as described and/or illustrated in International Patent Publication No. WO2016/178212 which is herein incorporated by reference in its entirety. Alternatively, or additionally, in some embodiments, the system of FIG. 11 includes a dental tool which optionally includes a tracking element.

Referring back to FIG. 12, in tracked measurement device 1252 includes a dental tool, for example, a drill, an ultrasonic scaler. Where, in some embodiments, the drill and/or tool includes one or more feature as described and/or illustrated in International Patent Publication No. WO2016/178212. Alternatively, or additionally, in some embodiments, the system of FIG. 12 includes a dental tool which optionally includes a tracking element.

In some embodiments, one or method as described elsewhere in this document and/or illustrated in the accompanying figures, is used to track (e.g. record position) of at least a portion of a dental tool (e.g. dental drill).

General

It is expected that during the life of a patent maturing from this application many relevant dental measurement technologies and/or tracking technologies will be developed; the scope of the terms tracked measurement device, IOS, tracking elements are intended to include all such new technologies a priori.

As used herein with reference to quantity or value, the term "about" means "within ±20% of".

The terms "comprises", "comprising", "includes", "including", "has", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular forms "a", "an" and "the" include plural references unless the context clearly dictates otherwise. For example, the term "a compound" or "at least one compound" may include a plurality of compounds, including mixtures thereof.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A dental measurement collection method performed by a measurement device comprising a first tracker and an elongate stylus including a tip; the method comprising:
    affixing a second tracker to a portion of the subject's mouth; said second tracker is mounted on or at least partially recessed inside an adaptor and the adaptor is sized and shaped to fit onto a portion the subject's mouth;
    calibrating a position of the tip with respect to the first tracker of the measuring device;
    receiving optical measurement data of at least a portion of a subject's mouth by an intraoral scanner (IOS) and the optical measurement data corresponds to a 3D model of a surface of the at least a portion of the subject's mouth;
    contacting a portion of a measuring device to portions of the subject's mouth for collecting position measurement data;
    aligning the optical measurement data and the position measurement data;
    combining the optical measurement data and the position measurement data to generate an updated 3-Dimensional (3D) model;
    and
    measuring a position of the measuring device with respect to the second tracker,
    wherein said receiving and said collecting are performed by two devices that are not attached to each other.

2. The method according to claim 1, wherein the optical measurement data and the position measurement data are associated with portions of a patient's mouth which do not completely overlap.

3. The method according to claim 1, further comprising correcting accumulated error in the optical measurement data using the position measurement data to correct accumulated error in a scan along a plurality of teeth.

4. The method according to claim 1, wherein combining comprises correcting the 3D model using the position measurement data to generate a corrected 3D model.

5. The method according to claim 1, further comprising using the position measurement data to improve accuracy of the optical measurement data.

6. The method according to claim 1 wherein:
    the measuring device comprises an elongate stylus including a tip, and
    the position measurement data comprises position measurement data for subgingival locations in the subject's mouth.

7. The method according to claim 1, wherein said contacting comprises contacting the tip of the elongate stylus to subgingival portions of at least one tooth.

8. The method according to claim 1, further comprising affixing the second tracker to a subject's tooth or teeth.

9. The method according to claim 1, further comprising estimating a required amount of position measurement data for a portion of the subject's mouth.

10. The method according to claim 1, wherein the measurement device is a standard dental probe onto which the first tracker is mounted.

11. The method according to claim 1, wherein:
    the measurement device comprises a dental drill, and
    the method further comprises measuring a position of said dental drill with respect to the second tracker.

12. The method according to claim 1, wherein the method further comprises affixing said tracker to a portion of the subject's mouth.

13. The method according to claim 1, wherein said tracker includes an electromagnet an electromagnetic position sensor configured to sense a position of the electromagnet.

14. The method according to claim 1, wherein at least one of the first tracker and the second tracker includes an electromagnet and at least one of the first tracker and the second tracker includes an electromagnetic position sensor configured to sense a position of the electromagnet.

15. The method according to claim 1, wherein said adaptor is one or more of an adhesive, a clamp, a rubber dam clamp, a loop of material tightened onto the tooth, a 3D printed adaptor, a dental implant abutment.

16. A dental measurement collection system for collecting dental measurements comprising:
    a measurement device comprising:
        an elongate element sized and shaped to be inserted between a tooth and surrounding gingiva;
        a first tracker mounted on or at least partially recessed within the measurement device;
        a second tracker;
        and
        an intraoral scanner (IOS);
    wherein:
        said measuring device and said intraoral scanner (IOS) are not attached to each other,
        a position of the tip is calibrated with respect to the first tracker of the measuring device,
        said second tracker is configured to be affixed to a portion of the subject's mouth, and
        said second tracker is mounted on or at least partially recessed inside an adaptor and the adaptor is sized and shaped to fit onto a portion the subject's mouth.

17. The system according to claim 16, wherein the second tracker is configured to be positioned external to the measurement device and not connected to a subject's mouth.

18. The system according to claim 16, further comprising a processor configured to cause the system to:
    align optical measurement data from the IOS and position measurement data from the measurement device;
    combine the optical measurement data and the position measurement data; and
    generate a 3-Dimensional (3D) model using the combined optical measurement data and position measurement data.

19. The system according to claim 16, wherein:
at least one of the first tracker and the second tracker includes an electromagnet; and
at least one of the first tracker and the second tracker includes an electromagnetic position sensor configured to sense a position of the electromagnet.

20. The system according to claim 16, further comprising a third tracker configured to be attached to a portion of a subject's mouth.

21. The system according to claim 16, wherein said adaptor is one or more of an adhesive, a clamp, a rubber dam clamp, a loop of material tightened onto the tooth, a 3D printed adaptor, a dental implant abutment.

22. A dental measurement collection method comprising:
receiving optical measurement data of at least a portion of a subject's mouth;
contacting a portion of a measuring device to portions of the subject's mouth to collect position measurement data;
aligning the optical measurement data and the position measurement data;
combining the optical measurement data and the position measurement data to generate a 3-Dimensional (3D) model;
and
correcting accumulated error in the optical measurement data using the position measurement data to correct accumulated error in a scan along a plurality of teeth.

* * * * *